United States Patent
Wang et al.

(10) Patent No.: US 12,089,217 B2
(45) Date of Patent: Sep. 10, 2024

(54) APPARATUSES AND METHODS FOR TIME DOMAIN RESOURCE SCHEDULING FOR GROUP TRANSMISSIONS

(71) Applicant: Telefonaktiebolaget LM Ericsson (publ), Stockholm (SE)

(72) Inventors: Min Wang, Luleå (SE); Mårten Ericson, Gammelstad (SE); Jan Christoffersson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 363 days.

(21) Appl. No.: 17/642,852

(22) PCT Filed: Sep. 18, 2019

(86) PCT No.: PCT/SE2019/050881
§ 371 (c)(1),
(2) Date: Mar. 14, 2022

(87) PCT Pub. No.: WO2021/054871
PCT Pub. Date: Mar. 25, 2021

(65) Prior Publication Data
US 2022/0386347 A1    Dec. 1, 2022

(51) Int. Cl.
*H04W 72/12*    (2023.01)
*H04W 72/1263*    (2023.01)
*H04W 72/21*    (2023.01)
*H04W 72/566*    (2023.01)

(52) U.S. Cl.
CPC ....... *H04W 72/21* (2023.01); *H04W 72/1263* (2013.01); *H04W 72/569* (2023.01)

(58) Field of Classification Search
CPC ............... H04W 72/21; H04W 72/569; H04W 72/1263
See application file for complete search history.

(56) References Cited

U.S. PATENT DOCUMENTS

2014/0295909 A1    10/2014    Ouchi et al.
2017/0289733 A1    10/2017    Rajagopal et al.
(Continued)

FOREIGN PATENT DOCUMENTS

EP    2779760 A1    9/2014
WO    2015163798 A1    10/2015
(Continued)

OTHER PUBLICATIONS

Huawei, HiSilicon, R2-161072, 'Discussion on Multiple Relay UE IDs for Relay UE', 3GPP TSG-GAN WG2 Meeting #93, Malta, Feb. 15-19, 2016, pp. 1-5. (Year: 2016).*

(Continued)

*Primary Examiner* — Melvin C Marcelo
(74) *Attorney, Agent, or Firm* — Murphy, Bilak & Homiller, PLLC

(57) ABSTRACT

The present disclosure relates to telecommunications. In one of its aspects, the disclosure concerns a method in a BS for time domain resource scheduling for group transmissions in a wireless communication system, which comprises the BS and a plurality of UEs, including a first UE. The plurality of UEs are assigned to a group. At least two of these UEs have data for group transmission to the BS. An aggregated BSR comprising BSRs from the at least two UEs is received from the first UE. The BS schedules time domain resources for at least one of SL transmissions of the data within the group and cooperative UL group transmissions of the data from the UEs to the BS. At least one bitmap indicating the scheduled time domain resources is generated and transmitted to the first UE. Each bit in each bitmap corresponds to a potential transmission in the corresponding UL and SL.

17 Claims, 11 Drawing Sheets

(56) References Cited

U.S. PATENT DOCUMENTS

| | | | |
|---|---|---|---|
| 2018/0070264 A1* | 3/2018 | Saiwai | H04W 72/04 |
| 2018/0213379 A1 | 7/2018 | Xiong et al. | |
| 2018/0295646 A1 | 10/2018 | Faurie et al. | |
| 2022/0264338 A1* | 8/2022 | Park | H04W 72/12 |
| 2022/0279529 A1* | 9/2022 | Christoffersson | H04W 72/21 |
| 2023/0276476 A1* | 8/2023 | Zhang | H04W 72/04 |
| | | | 370/329 |
| 2024/0015572 A1* | 1/2024 | Wang | H04W 72/23 |

FOREIGN PATENT DOCUMENTS

| | | |
|---|---|---|
| WO | 2017030520 A1 | 2/2017 |
| WO | 2017117253 A1 | 7/2017 |
| WO | 2017182068 A1 | 10/2017 |

OTHER PUBLICATIONS

3GPP, "3GPP TS 22.468 V12.1.0", 3rd Generation Partnership Project; Technical Specification Group Services and System Aspects; Group Communication System Enablers for LTE (GCSE_LTE) (Release 12), Apr. 2019, 1-20.

3GPP, "3GPP TS 23.468 V12.5.0", 3rd Generation Partnership Project; Technical Specification Group Services and System Aspects; Group Communication System Enablers for LTE (GCSE_LTE); Stage 2 (Release 12), Jun. 2015, 1-30.

Elmenreich, Wilfried, et al., "Building Blocks of Cooperative Relaying in Wireless Systems", Article in e & i Elektrotechnik und Informationstechnik, Research Gate, Aug. 14, 2008, 1-10.

* cited by examiner

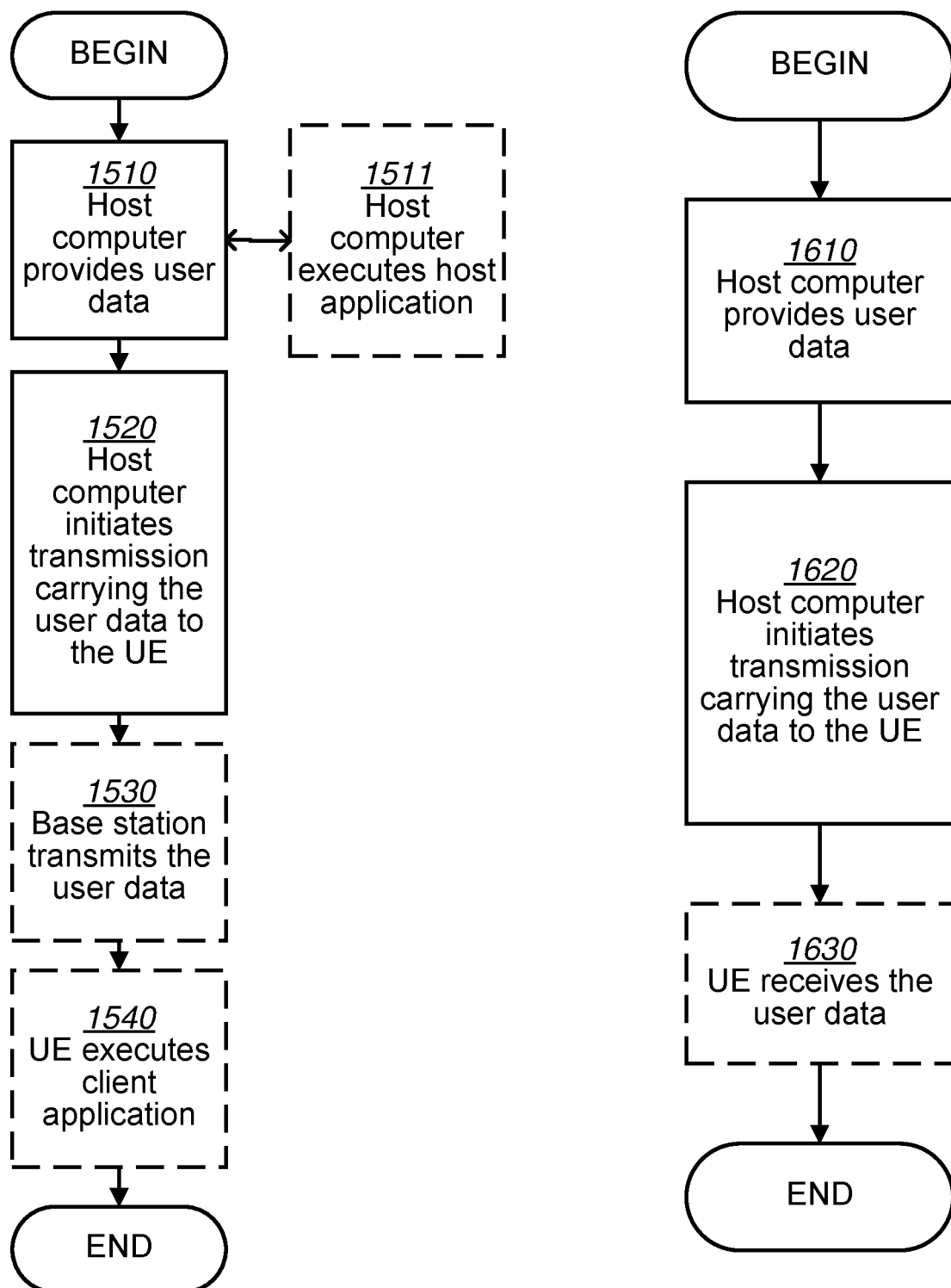

APPARATUSES AND METHODS FOR TIME DOMAIN RESOURCE SCHEDULING FOR GROUP TRANSMISSIONS

TECHNICAL FIELD

The present disclosure generally relates to telecommunications. In particular, the various embodiments described in this disclosure relate to apparatuses and methods for time domain resource scheduling for group transmissions in a wireless communication system.

BACKGROUND

This section is intended to provide a background to the various embodiments of the invention that are described in this disclosure. Therefore, unless otherwise indicated herein, what is described in this section should not be interpreted to be prior art by its mere inclusion in this section.

The basic way to transmit UpLink (UL) data in 4G and 5G systems is by using dynamic scheduling. FIG. 1 illustrates a typical scheduling procedure. In step 11, a User Equipment (UE) has data to be transmitted. This triggers a Buffer Status Report (BSR) and a Scheduling Request (SR) to a Base Station (BS), e.g. a gNB, to indicate that the UE has data to transmit (SR) and the amount of data (BSR). In step 12, the SR is transmitted to the gNB. The gNB typically responds with a small grant to let the UE provide the BSR, as illustrated in step 13. In step 14, the BSR is transmitted from the UE to the gNB, and in step 15, the gNB responds with a second grant tailored for the amount of data the UE has reported. Because the grants are tailored for the amount of data the UE has reported, dynamic scheduling is resource efficient.

Another option for transmissions is using configured grants or Semi-Persistent Scheduling (SPS). Then, the UE is configured with grants that are periodical. In case the UE has data to send, it may use the configured grant. The benefit of a configured grant is that it may have a short latency, if configured with short periodicity. However, it lacks the flexibility of dynamic grants, since Transport Block Size (TBS) and coding are fixed. Furthermore, it may also be wasteful with resources if the utilization is low. Configured grant is similar to Mode 2 in ProSe, described below, but is typically provided to a single UE, which reduces the risk of colliding transmissions, which may happen in ProSe.

Proximity-based Services (ProSe) is one example of technology that may be used to transmit data within a group of UEs. ProSe is a Device-to-Device (D2D) technology that allows LTE UEs to detect each other and to communicate directly. In ProSe, so-called SideLinks (SLs) are used. Autonomous resource selection using Resource Pools (RPs) are defined, where some cellular UL subframes, as indicated by a bitmap, are (partly) reserved for the SL transmissions. In each subframe eligible for SL, the use of the resource blocks is split between SL and cellular UL. A UE may be assigned with a specific RP to use for SL transmissions. In case the UE is in connected to a radio network and within coverage, the eNB may schedule the RPs to the UE(s). In other cases, the UE will select RP from a set of pre-assigned RPs. When the UE is in coverage and connected to the network, scheduled resource allocation may also be used. In the Medium Access Control (MAC) layer, the MAC header has two fields, wherein one is for source, i.e. the transmitting UE, and one is for destination, i.e. the intended receiving group. There is no Hybrid Automatic Repeat reQuest (HARD) feedback for the SL transmission. Instead, each transport block is retransmitted three times in consecutive subframes.

A ProSe communicating UE may operate in two modes for resource allocation: scheduled resource allocation, mode 1, and UE autonomous resource selection, mode 2. For scheduled resource allocation, mode 1, the UE requests transmission resources from the BS, i.e. the eNB, and the eNB schedules transmission resources for transmission of D2D control and data. The UE needs to be connected to the network in order to transmit data in this mode. For UE autonomous resource selection, mode 2, the UE selects resources on its own from resource pools to transmit D2D control and data.

If a UE is out of coverage, it may only use autonomous resource selection, as there is no way for the UE to send SR and BSR to the eNB and thereby obtain a grant for a scheduled resource. If the UE is in coverage, it may use scheduled resource allocation or autonomous resource selection as per eNB configuration. When an exceptional case occurs, the UE may be allowed to use UE autonomous resource selection temporarily even though it was configured to use scheduled resource allocation. Idle UEs can only use autonomous resource selection.

From a transmitter perspective, a ProSe communication UE may follow the procedure for mode 1 communication as shown in FIG. 2. In a first step 1, the UE sends a scheduling request, e.g. Random Access (RA), to the eNB. In step 2, the UE receives resource grant from the eNB. Thus, both this steps are the same as in legacy LTE procedure. Thereafter, in step 3, the UE sends a ProSe BSR requesting resource for ProSe communication and the UE receives resource grant for ProSe communication in step 4.

For mode 2 communication, the resource pools are provided by the system broadcast information and the UE may select the resources from the resource pool. The resources used by SL is taken from the RP configured by the network, i.e. the eNB. FIG. 3 shows a schematic figure of RPs for SL transmission and shows how the resources are repeated in time. Whether a subframe may be used for SL is indicated in a subframe bitmap. After a configurable period, the SL Control period (SC period), the whole pattern repeats. The SLs indicate sidelink transmission occasions. The dark squares indicate D2D resources for a group A. Any UE in group A may use these Physical Resource Blocks (PRBs) for group communication. The white squares indicate PRBs for normal Uu UL transmission. FIG. 3 reflects the similarities with configured grants, i.e. that the UE may transmit at certain time instances.

SUMMARY

By using Device-to-Device (D2D) group communication, uplink coverage and user bit rate may be increased, for example in a high frequency 5G, or New Radio (NR), network. On a high level, a group of User Equipment (UEs), or sensors, may be D2D capable. When a UE has data to transmit, it may first distribute this data to neighbouring UEs in the group over the D2D or SideLink (SL). In a second step, the UEs in the group may cooperatively transmit the data over the cellular UpLink (UL). The cooperative transmission may increase the UL coverage e.g. by combining several UEs total output power and may be beneficial from a latency point of view compared to repeated transmissions for coverage, as used e.g. in Long Term Evolution (LTE) narrowband.

The 2-hop group transmission concept, i.e. where data first is transmitted over SL to the group and thereafter cooperatively transmitted over the cellular UL, is illustrated in FIGS. 4a and 4b. FIGS. 4a and 4b show a UE in a group that wants to transmit data through the group. FIG. 4a illustrates the first step, i.e. the 1st hop, where the UE sends its data over the SL to the other UEs in the group. FIG. 4b illustrates the second step, i.e. the 2nd hop, where the data is sent in a synchronized manner from the UEs in the group over the cellular UL to a network node or Base Station (BS), e.g. an eNB or a gNB. In DL, the network may transmit data to the group as if the group was a single UE. At least one UE in the group must be able to receive the DL data, and if necessary, the DL data may be relayed to the other UEs in the group via D2D. This technique is also known as cooperative relaying or Virtual Antenna Array.

However, the existing Proximity-based Services (ProSe) concept, i.e. LTE Device-to-Device (D2D), has some limitations. It cannot support 2-hop group, cooperative, transmission because it is not possible to perform scheduling of the 2-hop group transmission. If multiple UEs in a group of UEs have data for transmission via the group, the BS have to schedule the UEs one by one. This may lead to a large overhead, both in UL and DownLink (DL), especially for small and bursty traffic. There are several issues with the existing ProSe concept; it is a risk of high signalling overhead on the cellular link and UEs with prioritized data may have to wait to be scheduled until the BS has scheduled other UEs. Accordingly, there is a need for enhanced scheduling in terms of reduction of signalling overhead and scheduling latency.

It is in view of the above background and other considerations that the various embodiments of the present disclosure have been made.

It is proposed to provide a solution to address this problem, i.e. providing an enhanced dynamic scheduling, which reduce signalling overhead and scheduling latency.

This general object has been addressed by the appended independent claims. Advantageous embodiments are defined in the appended dependent claims.

According to a first aspect, there is provided a method in a BS for time domain resource scheduling for group transmissions in a wireless communication system.

The wireless communications system comprises the BS and a plurality of UEs including a first UE. The plurality of UEs are assigned to a group, wherein at least two of the UEs within the assigned group have data for group transmission to the BS. The method comprises receiving, from the first UE within the assigned group, an aggregated Buffer Status Report (BSR). The aggregated BSR comprises BSRs from the at least two UEs within the assigned group that have data for group transmission to the BS. The method further comprises scheduling time domain resources for the data to be transmitted via group transmissions to the BS. Time resources are scheduled for at least one of SideLink (SL) transmissions of the data within the assigned group and cooperative UpLink (UL) group transmissions of the data from the UEs within the assigned group to the BS. Thereafter, the method comprises generating at least one bitmap indicating the scheduled time domain resources for at least one of the SL transmissions and the cooperative UL group transmissions. Each bit in each bitmap corresponds to a potential transmission in the corresponding UL and SL. Thereafter, the method further comprises transmitting, to the first UE within the assigned group, a scheduling message comprising the generated at least one bitmap.

In some embodiments, the method further comprises receiving, from each of the UEs within the assigned group, data in the time domain resources in accordance with the transmitted bitmap for the cooperative UL group transmission of data to the BS.

In some embodiments, sizes of the bitmaps are set to be at least equal to a number of UEs within the assigned group.

In some embodiments, each UE that has data for transmission within the assigned group has a corresponding position in the at least one bitmap. The positions in the bitmaps may be determined based on a UE index. Alternatively, the positions in the bitmaps may be determined based on amount of data to be transmitted for each UE and/or priority order of a service relating to the data to be transmitted for each UE.

In some embodiments, the scheduling message comprising the bitmap is transmitted via Radio Resource Control (RRC) signalling, Digital Carrier Interface (DCI) signalling and/or via a Medium Access Control (MAC) Control Element (CE).

According to a second aspect, there is provided a method in a first UE 400 for time domain resource scheduling for group transmission in a wireless communication system.

The wireless communications system comprises a BS and a plurality of UEs including the first UE. The plurality of UEs are assigned to a group, wherein at least two of the UEs within the assigned group have data for group transmission to the BS. The method comprises transmitting, to the BS, an aggregated BSR. The aggregated BSR comprises BSRs from the at least two UEs within the assigned group that have data for group transmission to the BS. The method further comprises receiving, from the BS, a scheduling message comprising at least one bitmap. The at least one bitmap indicates scheduled time domain resources for at least one of SL transmissions of data within the assigned group and cooperative UL group transmissions of the data from the UEs within the assigned group to the BS. Each bit in each bitmap corresponds to a potential transmission in the corresponding UL and SL.

In some embodiments, the method further comprises broadcasting, to the plurality of UEs within the assigned group, the received scheduling message comprising the bitmaps.

In some embodiments, the method further comprises receiving, from one of the UEs within the assigned group that have data for group transmission to the BS, data in the time domain resources in accordance with the received bitmap for the SL transmission of data.

In some embodiments, the method further comprises transmitting, to the BS, data in the time domain resources in accordance with the received bitmap for the cooperative UL group transmission of data.

In some embodiments, sizes of the bitmaps are set to be at least equal to a number of UEs within the assigned group.

In some embodiments, each UE within the assigned group that has data for transmission has a corresponding position in the at least one bitmap. The positions in the bitmaps may be determined based on a UE index. Alternatively, the positions in the bitmaps are determined based on amount of data to be transmitted for each UE and/or priority order of a service relating to the data to be transmit for each UE.

In some embodiments, the scheduling message comprising the bitmap is transmitted via RRC signalling, DCI signalling and/or via a MAC CE According to a third aspect, there is provided a BS configured to perform the method according to the first aspect.

The BS is configured for time domain resource scheduling for group transmissions in a wireless communication system. The wireless communication system comprises the BS and a plurality of UEs including a first UE. The plurality of UEs are assigned to a group. At least two of the UEs within the assigned group have data for group transmission to the BS. The BS comprises a processing circuitry and a memory circuitry. The memory circuit stores computer program code which, when run in the processing circuitry, causes the BS to receive, from the first UE within the assigned group, an aggregated BSR. The aggregated BSR comprises BSRs from the at least two UEs within the assigned group that have data for group transmission to the BS. The BS is further configured to schedule time domain resources for the data to be transmitted via group transmissions to the BS. Time resources are scheduled for at least one of SL transmissions of the data within the assigned group and cooperative UL group transmissions of the data from the UEs within the assigned group to the BS. Thereafter, the BS is caused to generate at least one bitmap indicating the scheduled time domain resources for at least one of the SL transmissions and the cooperative UL group transmissions. Each bit in each bitmap corresponds to a potential transmission in the corresponding UL and SL. The BS is thereafter configured to transmit, to the first UE within the assigned group, a scheduling message comprising the generated at least one bitmap.

In some embodiments, the memory circuitry storing computer program code which, when run in the processing circuitry, further causes the BS to receive, from each of the UEs within the assigned group, data in the time domain resources in accordance with the transmitted bitmap for the cooperative UL group transmission of data to the BS.

In some embodiments, sizes of the bitmaps are set to be at least equal to a number of UEs within the assigned group.

In some embodiments, each UE that has data for transmission within the assigned group has a corresponding position in the at least one bitmap. The positions in the bitmaps may be determined based on a UE index. Alternatively, the positions in the bitmaps may be determined based on amount of data to be transmitted for each UE and/or priority order of a service relating to the data to be transmitted for each UE.

In some embodiments, the scheduling message comprising the bitmap is transmitted via RRC signalling, DCI signalling and/or via a MAC CE.

According to a fourth aspect, there is provided a first UE configured to perform the method according to the second aspect.

The first UE is configured for time domain resource allocation for group transmission in a wireless communication system. The wireless communication system comprises a BS and a plurality of UEs including the first UE. The plurality of UEs are assigned to a group. At least two of the UEs within the assigned group have data for group transmission to the BS. The first UE comprises a processing circuitry and a memory circuitry. The memory circuit stores computer program code which, when run in the processing circuitry, causes the first UE to transmit, to the BS, an aggregated BSR. The aggregated BSR comprises BSRs from the at least two UEs within the assigned group that have data for group transmission to the BS. The first UE is further caused to receive, from the BS, a scheduling message comprising at least one bitmap. The at least one bitmap indicates scheduled time domain resources for at least one of SL transmissions of data within the assigned group and cooperative UL group transmissions of the data from the UEs within the assigned group to the BS. Each bit in each bitmap corresponds to a potential transmission in the corresponding UL and SL.

In some embodiments, the memory circuitry storing computer program code which, when run in the processing circuitry, further causes the first UE to broadcast, to the plurality of UEs within the assigned group, the received scheduling message comprising the bitmaps.

In some embodiments, the memory circuitry storing computer program code which, when run in the processing circuitry, further causes the first UE to receive, from one of the UEs within the assigned group that have data for group transmission to the BS, data in the time domain resources in accordance with the received bitmap for the SL transmission of data.

In some embodiments, the memory circuitry storing computer program code which, when run in the processing circuitry, further causes the first UE to transmit, to the BS, data in the time domain resources in accordance with the received bitmap for the cooperative UL group transmission of data.

In some embodiments, sizes of the bitmaps are set to be at least equal to a number of UEs within the assigned group.

In some embodiments, each UE within the assigned group that has data for transmission has a corresponding position in the at least one bitmap. The positions in the bitmaps may be determined based on a UE index. Alternatively, the positions in the bitmaps may be determined based on amount of data to be transmitted for each UE and/or priority order of a service relating to the data to be transmit for each UE.

In some embodiments, the scheduling message comprising the bitmap is transmitted via RRC signalling, DCI signalling and/or via a MAC CE.

According to a fifth aspect, there is provided a computer program, comprising instructions which, when executed on a processing circuitry, cause the processing circuitry to carry out the method according to the first aspect and/or the second aspect.

According to a sixth aspect, there is provided a carrier containing the computer program of the fifth aspect, wherein the carrier is one of an electronic signal, optical signal, radio signal, or computer readable storage medium.

The various proposed embodiments herein provide a solution for scheduling multiple group transmissions to a BS in a way that reduces signalling overhead and scheduling latency.

BRIEF DESCRIPTION OF THE DRAWINGS

These and other aspects, features and advantages will be apparent and elucidated from the following description of various embodiments, reference being made to the accompanying drawings, wherein:

FIGS. 15 and 16 show example methods implemented in a communication system including a host computer, a base station and a user equipment.

DETAILED DESCRIPTION

The present invention will now be described more fully hereinafter. The present invention may, however, be embodied in many different forms and should not be construed as limited to the embodiments set forth herein; rather, these embodiments are provided by way of example so that this disclosure will be thorough and complete, and will fully convey the scope of the invention to those persons skilled in the relevant art. Like reference numbers refer to like elements throughout the description.

In one of its aspects, the disclosure presented herein concerns a method in a Base Station (BS) for time domain resource scheduling for group transmissions in a wireless communication system.

Figure 1:
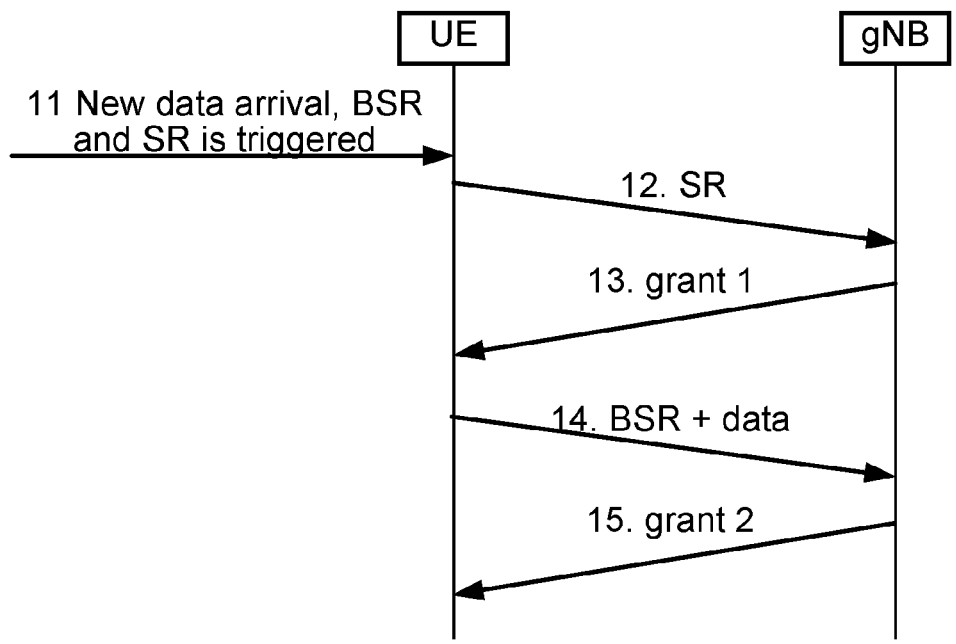
FIG. 1 illustrates a dynamic scheduling procedure.
Figure 2:
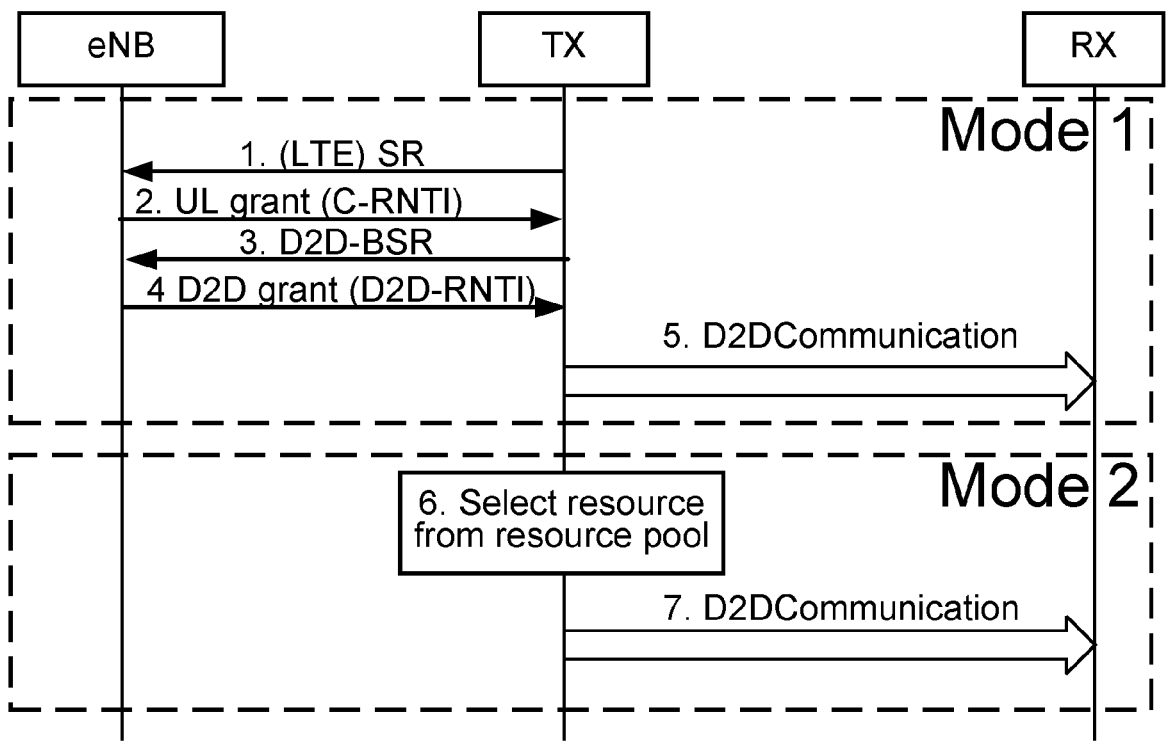
FIG. 2 illustrates ProSe communication.
Figure 3:
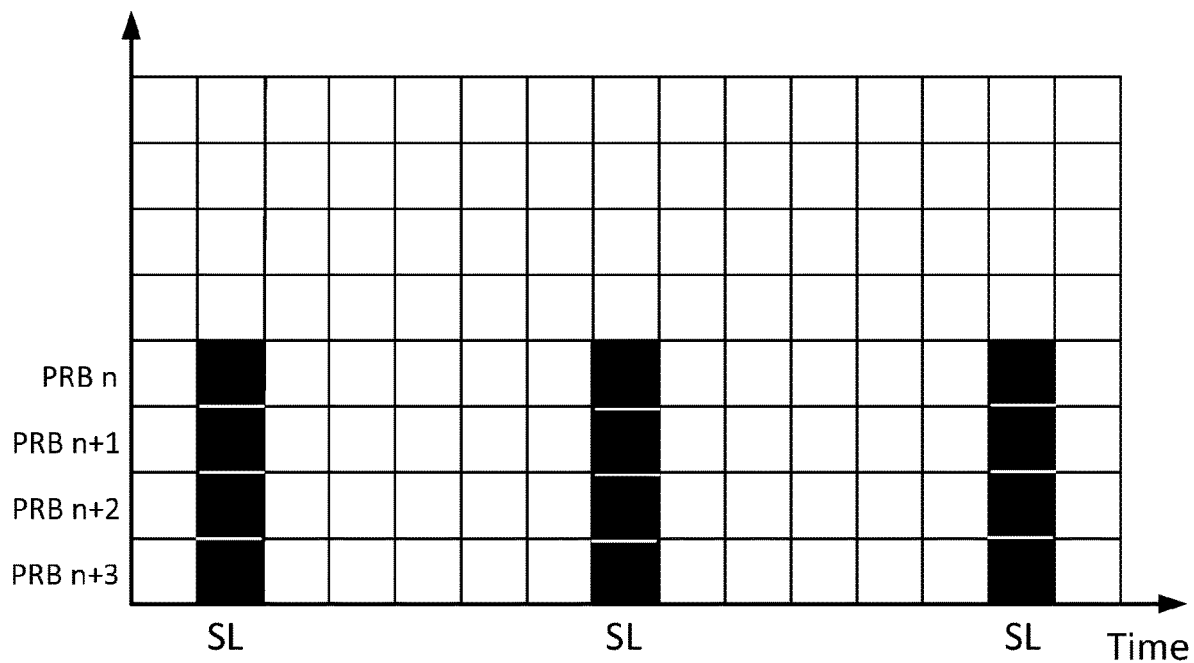
FIG. 3 shows a schematic figure of RPs for SL transmission.
Figure 4A:
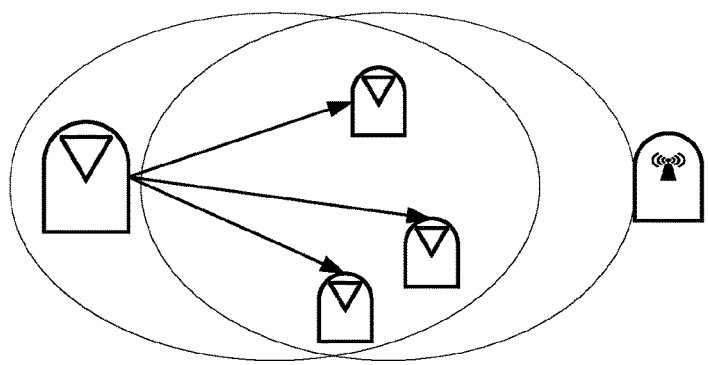
FIGS. 4a and 4b show schematic figures of 2-hop group communication.
Figure 4B:
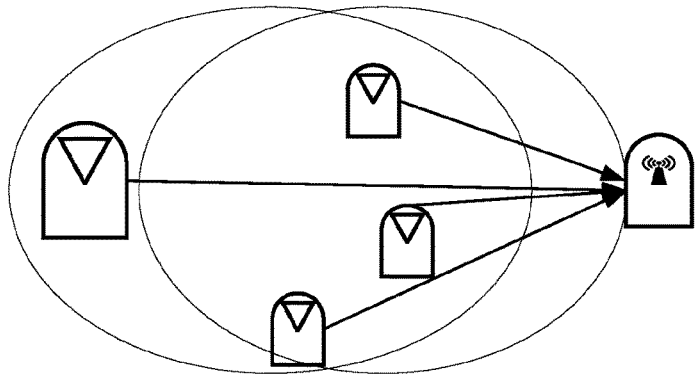
Figure 5A:
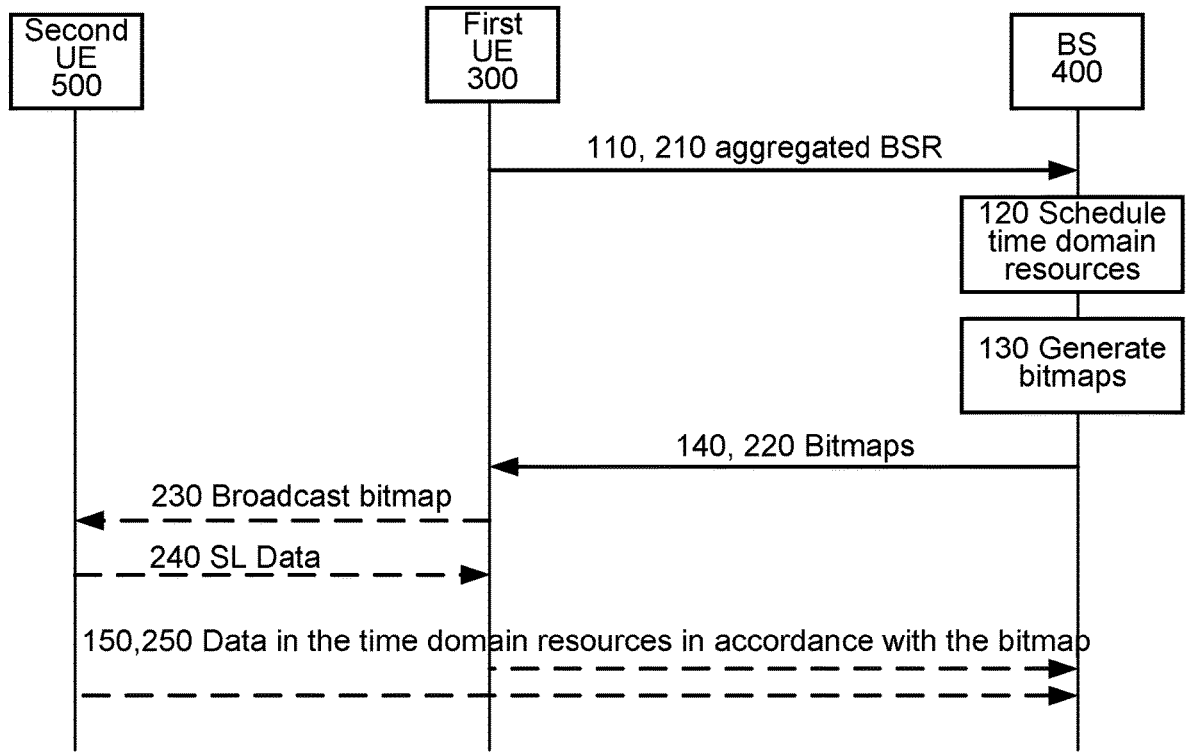
FIG. 5a is a message sequence chart of a process for time domain resource scheduling for group transmissions in a wireless communication system.
Figure 6:
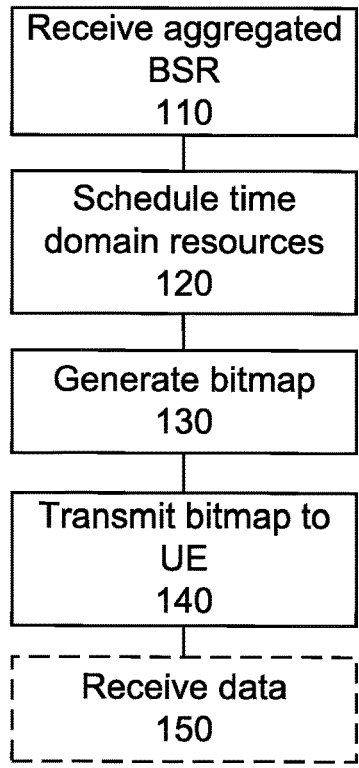
FIG. 6 is a flowchart of an example method performed by a BS.

With reference to the FIGS. 5a and 6, a first embodiment will now be described. FIG. 5a illustrates a message sequence chart of a process for time domain resource scheduling of group transmissions in a wireless communication system. FIG. 6 illustrates a method 100 in a BS 300, for time domain resource scheduling for group transmissions in a wireless communication system. The wireless communications system comprises the BS 300 and a plurality of UEs, including a first UE 400. The plurality of UEs are assigned to a group. At least two of the UEs within the assigned group have data for group transmission to the BS 300.

The method 100 starts at step 110 with receiving, from the first UE 400 within the assigned group, an aggregated Buffer Status Report (BSR). The aggregated BSR comprises BSRs from the at least two UEs within the assigned group that have data for group transmission to the BS 300. Accordingly, the aggregated BSR comprises information about at least two BSR transmitted from at least two corresponding UEs. The aggregated BSR may be used instead of transmitting a BSR via the first UE 400 for every UE within the assigned group separately. The BSRs received by the first UE 400, from the at least two UEs 500, may be queued in the first UE 400 within a configured time interval and then transmitted together as an aggregated group BSR for the at least two UEs to the BS 300 via the first UE 400. All BSRs received by the first UE 400 may be aggregated into one message or Medium Access Control (MAC) Control Element (CE).

The method 100 then continues with step 120 of scheduling time domain resources for the data to be transmitted via group transmissions to the BS 300. Time resources are scheduled for at least one of SideLink (SL) transmissions of the data within the assigned group and cooperative UpLink (UL) group transmissions of the data from the UEs within the assigned group to the BS 300. Accordingly, the BS 300 may schedule time resources for SL transmissions or for UL group transmissions. Alternatively, the BS 300 may schedule time resources for both SL transmissions and UL group transmissions. Thereafter, the method continues with step 130 of generating at least one bitmap indicating the scheduled time domain resources for at least one of the SL transmissions and the cooperative UL group transmissions. Each bit in each bitmap corresponds to a potential transmission in the corresponding UL and/or SL. Each bit may contain a number of consecutive Orthogonal Frequency Division Multiplexing (OFDM) symbols varying in the range between 1 and 14. Thereafter, the method further continues with step 140 of transmitting, to the first UE 400 within the assigned group, a scheduling message comprising the generated at least one bitmap. In some embodiments, the at least one bitmap may be valid for a configured time period. Within this period, the bitmap may repeat until the associated window period expires.

Accordingly, the method 100 according to the present disclosure enables the BS 300 to schedule resources for several UEs simultaneous. The scheduled resources may span multiple frequency regions/Physical Resource Blocks (PRBs) and be valid in multiple Transmission Time Intervals (TTIs)/slots. The resources for each UE in the time domain are indicated using the at least one bitmap. The at least one bitmap indicates time resources for the group cellular link. By using at least one bitmap, a great flexibility of configurations is given. Furthermore, usage of bitmaps may be beneficial to reduce control signalling overhead. The BS 300 does not have to send a Digital Carrier Interface (DCI) signalling or Radio Resource Control (RRC) signalling for every group transmission.

Thus, the proposed method 100 provides an enhanced dynamic scheduling method with group bitmaps indicating time domain resources for group based transmissions. With a group bitmap, the BS 300 may schedule a group of UEs in the time domain in a flexible way instead of separate scheduling for each individual UE in the group. The group bitmap minimizes the scheduling overhead in case there are multiple UEs in the group that have data to transmit. Furthermore, the BS 300 may also prioritize certain traffic types easier since it schedules the group in one instance.

In some embodiments, the method 100 may further comprise the step 150 of receiving, from each of the UEs within the assigned group, data in the time domain resources in accordance with the transmitted bitmap for the cooperative UL group transmission of data to the BS 300. Thus, the UEs within the assigned group may transmit the data in accordance with the generated at least one bitmap.

In some embodiments, sizes of the bitmaps may be set to be at least equal to a number of UEs within the assigned group. The bitmap size may be configured to cover a time period during which all UEs within the assigned group should be able to transmit data, i.e. at least one slot per transmission opportunity. Considering that the allocated time positions for group UEs may not be consecutive in time, the bitmap size may at least be equal to the group size, i.e. the number of UEs in the assigned group. Additionally, the bitmap size may also consider the system load that is created by the group transmissions. In one embodiment, transmissions in the group may contribute to 50% of the load in the cellular link; in that case, the bitmap size for the cellular link may be set as two times of the group size.

In some embodiments, each UE that has data for transmission within the assigned group may have a corresponding position in the at least one bitmap. Thus, a UE without data for transmission may be excluded from the at least one bitmap for reduction of signalling overhead purposes. If a UE has new data, which arrived after the bitmap was already signalled or configured to the group during an associated period, the UE may be assigned with a position in the at least one bitmap during next associated period. In one example embodiment, the positions in the bitmaps may be determined based on a UE index. Each UE has a unique index in the assigned group. An index may be assigned to a UE when a UE joins the group. In this example embodiment, a UE with index 1 (the lowest index) may be mapped to the first bitmap position with value 1. A UE with index 3 may correspond to the second bitmap position with value 1, if the UE with index 2 does not have any data in its buffer for transmission within the associated period. In another example embodiment, the positions in the bitmaps may be determined based on amount of data to be transmitted for each UE and/or priority order of a service relating to the data to be transmitted for each UE. Priority order may additionally, or alternatively, be assigned to a UE depending on data volume in the UE buffer. A UE associated with the lowest priority index, e.g. highest priority, with data in the buffer may be mapped to the first position with value 1 in the bitmap. Similar, a UE with second highest priority order with data in the buffer may be mapped to the second position with value 1 in the bitmap. The index or the priority of each UE may be reconfigured, by the BS 300 or the group coordinator, i.e. the first UE 400, from time to time. All UEs in the group need to know the information on which UEs in the group that have data for transmission. Such information may, for example, be broadcasted in the group via the SL by the group coordinator 400 while it transmits aggregated BSRs to the BS 300.

In some embodiments, the SL and the cellular link, i.e. the UL, may share the same frequency region. Then, transmission opportunities for both links may be Time Division Multiplexed (TDMed). In other words, some slots may be allocated for the SL, while some other slots may be allocated to the cellular link. They may not be overlapped in time.

Figure 5B:
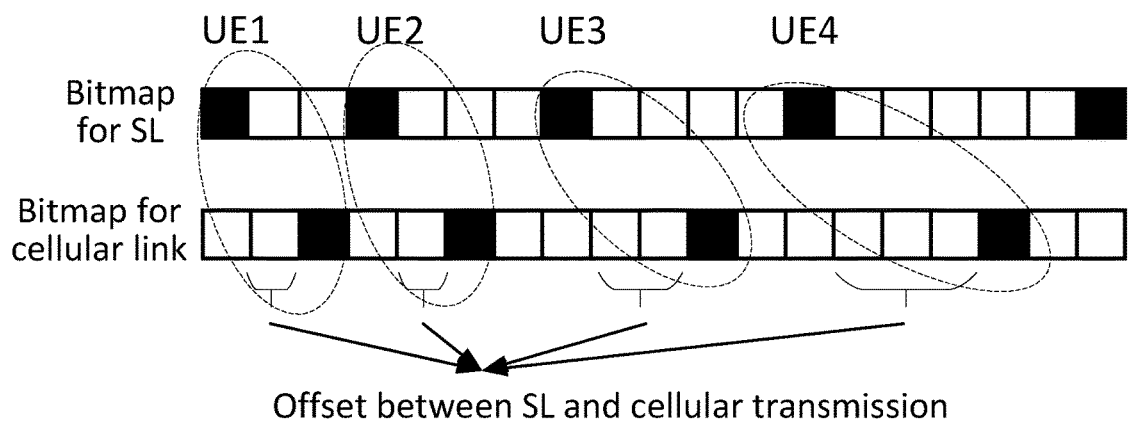
FIGS. 5b, c, d show various examples with bitmaps.

In these embodiments, as a first example, the BS 300 may assign frequency resources to the group of UEs. In addition, two bitmaps may be assigned for the group to indicate time resources. One bitmap may be used to indicate allocated and enabled transmission positions for the SL, while another bitmap may be used to indicate allocated and enabled transmission positions for the cellular link. As illustrated in FIG. 5b, each UE may have a corresponding position in the bitmap. For each UE, its time position in the cellular link may be later than its time position in the SL. FIG. 5b illustrates four UEs; UE1, UE2, UE3 and UE4. These four UEs are assigned with different time positions in both SL and cellular link. Each of them may have one slot allocated to transmit in the SL and the cellular link separately. In FIG. 5b, the transmission opportunities on both links may be scheduled per slot.

Figure 5C:
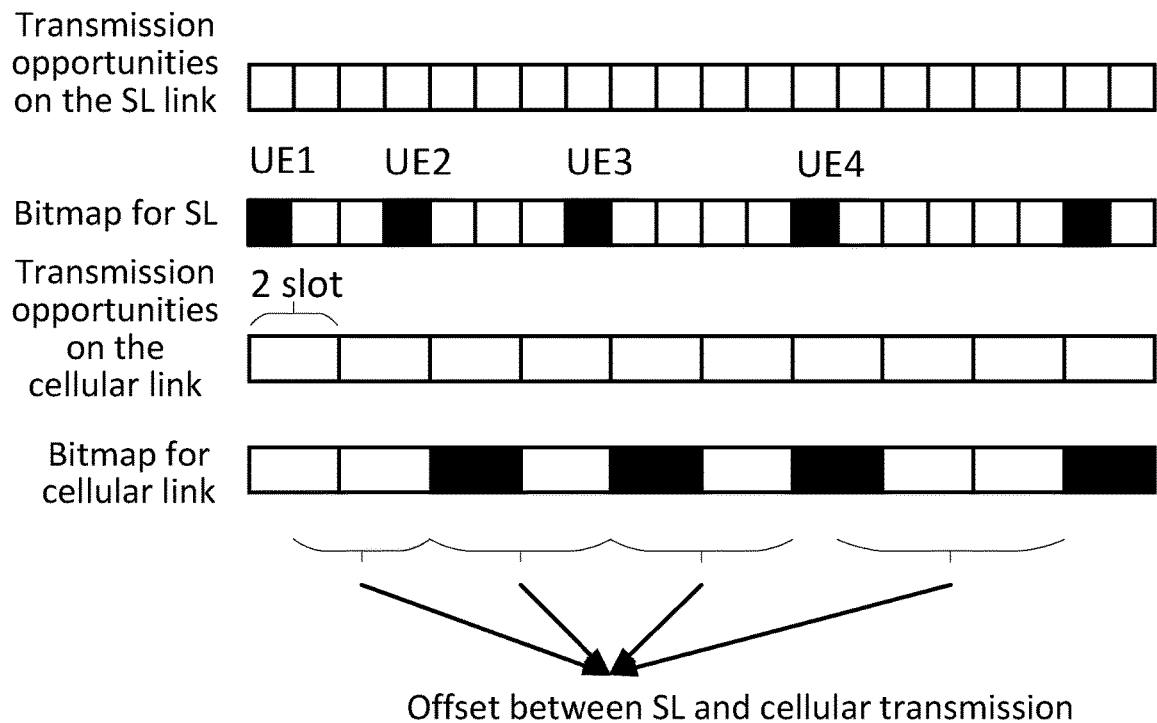

As a second example, illustrated in FIG. 5c, each transmission opportunity on the SL may be scheduled per slot, while each transmission opportunity on the cellular link may be two consecutive slots.

Figure 5D:
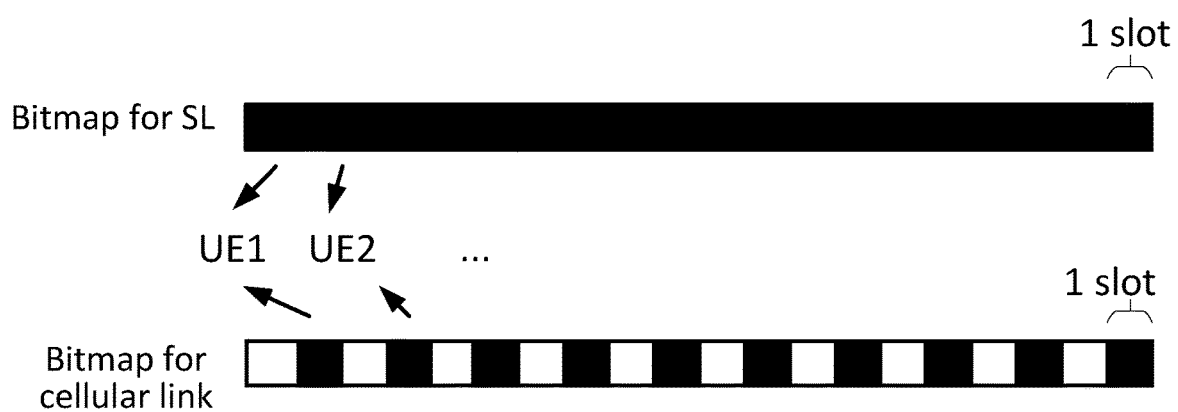

In some other embodiments, the SL and the cellular UL may be deployed on different carriers. According to these embodiments, the transmission opportunities for both links may overlap in time, since transmissions on both links are separated in the frequency domain. FIG. 5d illustrates one example of bitmaps wherein SL and cellular links may be deployed on different frequency regions.

In some embodiments, the scheduling message comprising the bitmap may be transmitted via Radio Resource Control (RRC) signalling, Digital Carrier Interface (DCI) signalling and/or via a Medium Access Control (MAC) Control Element (CE). Accordingly, a bitmap for a link, either SL or cellular UL, may, for example, be carried by an RRC signalling, included in an RRC Information Element (IE), for example Physical Uplink Shared Channel (PUSCH)-Config. To update a bitmap value in a new association period, the BS 300, together with the group coordinator, i.e. the first UE 400, may send a RRC reconfiguration message to the group of UEs. Alternatively, or additionally, a bitmap for a link, either SL or cellular link, may, for example, be carried by a DCI signalling. A new DCI format may be required. The DCI may also carry a link indicator, which indicates that the bitmap is intended for SL or cellular link. Alternatively, or additionally, a MAC CE may be used. A new MAC CE may be defined accordingly. As stated, the three alternatives may be applied together.

According to a second aspect, there is provided a method 200 in a first UE 400 for time domain resource scheduling for group transmission in a wireless communication system.

Figure 7:
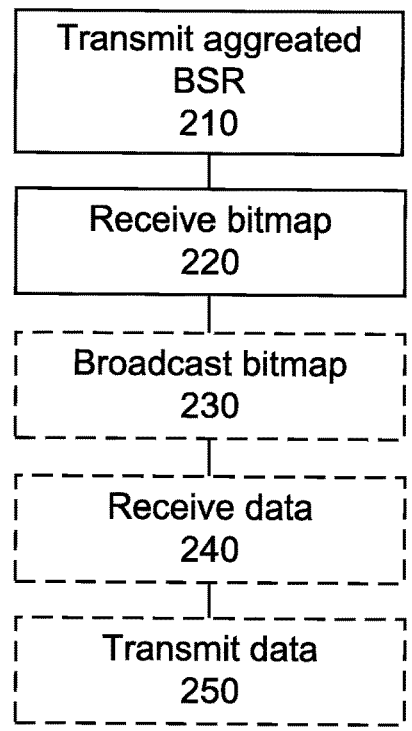
FIG. 7 is a flowchart of an example method performed by a first UE.

With reference to the FIGS. 5a and 7, a first embodiment will now be described. As stated above, FIG. 5a illustrates a message sequence chart of a process for time domain resource scheduling for group transmissions in a wireless communication system. FIG. 7 illustrates a method 200 in a first UE 400 for time domain resource scheduling for group transmissions in a wireless communication system. The wireless communications system comprises a BS 300 and a plurality of UEs including the first UE 400. The plurality of UEs are assigned to a group. At least two of the UEs within the assigned group have data for group transmission to the BS 300.

The method starts at step 210 with transmitting, to the BS 300, an aggregated BSR. The aggregated BSR comprises BSRs from the at least two UEs within the assigned group that have data for group transmission to the BS 300. The method 200 then continues with step 220 of receiving, from the BS 300, a scheduling message comprising at least one bitmap. The at least one bitmap indicates scheduled time domain resources for at least one of SL transmissions of data within the assigned group and cooperative UL group transmissions of the data from the UEs within the assigned group to the BS 300. Each bit in each bitmap corresponds to a potential transmission in the corresponding UL and SL.

Thus, the proposed method 200 provides a solution for scheduling multiple group transmissions to a BS 300 in a way that reduces signaling overhead and scheduling latency. An enhanced dynamic scheduling method 200 with group bitmaps indicating time domain resources for group based transmissions is provided. With a group bitmap, a group of UEs may be scheduled in the time domain in a flexible way instead of separate scheduling for each individual UE in the group. The group bitmap minimizes the scheduling overhead in case there are multiple UEs in the group that have data to transmit.

In some embodiments, the method 200 may further comprise the step 230 of broadcasting, to the plurality of UEs within the assigned group, the received scheduling message comprising the bitmaps. In other embodiments, the bitmaps may be broadcasted from the BS 300 to the UEs within the assigned group.

In some embodiments, the method may further comprise the step 240 of receiving, from one of the UEs within the assigned group that have data for group transmission to the BS 300, data in the time domain resources in accordance with the received bitmap for the SL transmission of data.

In some embodiments, the method may further comprise the step 250 of transmitting, to the BS 300, data in the time domain resources in accordance with the received bitmap for the cooperative UL group transmission of data.

In some embodiments, sizes of the bitmaps may be set to be at least equal to a number of UEs within the assigned group.

In some embodiments, each UE within the assigned group that has data for transmission may have a corresponding position in the at least one bitmap. The positions in the bitmaps may be determined based on a UE index. Alternatively, the positions in the bitmaps may be determined based on amount of data to be transmitted for each UE and/or priority order of a service relating to the data to be transmit for each UE.

In some embodiments, the scheduling message comprising the bitmap may be transmitted via RRC signalling, DCI signalling and/or via a MAC CE According to a third aspect, there is provided a BS 300 configured to perform the method 100 according to the first aspect.

Figure 8:
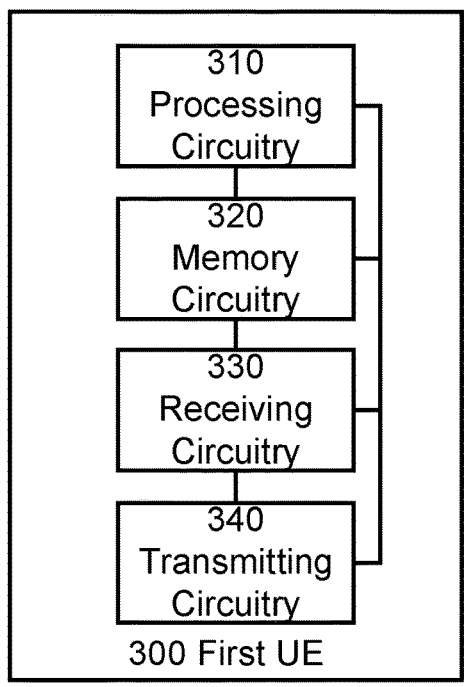
FIG. 8 shows an example implementation of a BS.

The BS 300 is now going to be described with reference to FIG. 8. The BS 300 may be used in, but are not limited to, a wireless communication system. The wireless communication system comprises the BS 300 and a plurality of UEs including a first UE 400. The plurality of UEs being assigned to a group. At least two of the UEs within the assigned group have data for group transmission to the BS 300.

The BS 300 is configured for time domain resource scheduling for group transmissions in the wireless communication system. As illustrated in FIG. 8, the BS 300 comprises a processor, or a processing circuitry 310, and a memory, or a memory circuitry 320.

Additionally, or alternatively, the BS 300 may further comprise a transmitter, or a transmitting circuitry 340, configured to transmit data to other apparatuses, such as the first UE 400.

Additionally, or alternatively, the BS 300 may further comprise a receiver, or a receiving circuitry 330, configured to receive data from other apparatuses, such as the first UE 400.

The memory circuit 320 stores computer program code which, when run in the processing circuitry 310, causes the BS 300 to receive, from the first UE 400 within the assigned group, an aggregated BSR. The aggregated BSR comprises BSRs from the at least two UEs within the assigned group that have data for group transmission to the BS 300. The BS 300 is further configured to schedule time domain resources for the data to be transmitted via group transmissions to the BS 300. Time resources are scheduled for at least one of SL transmissions of the data within the assigned group and cooperative UL group transmissions of the data from the UEs within the assigned group to the BS 300. Thereafter, the BS 300 is caused to generate at least one bitmap indicating the scheduled time domain resources for at least one of the SL transmissions and the cooperative UL group transmissions. Each bit in each bitmap corresponds to a potential transmission in the corresponding UL and SL. The BS 300 is thereafter configured to transmit, to the first UE 400 within the assigned group, a scheduling message comprising the generated at least one bitmap.

In some embodiments, the memory circuitry 320 storing computer program code which, when run in the processing circuitry 310, may further cause the BS 300 to receive, from each of the UEs within the assigned group, data in the time domain resources in accordance with the transmitted bitmap for the cooperative UL group transmission of data to the BS 300.

In some embodiments, sizes of the bitmaps may be set to be at least equal to a number of UEs within the assigned group.

In some embodiments, each UE that has data for transmission within the assigned group may have a corresponding position in the at least one bitmap. The positions in the bitmaps may be determined based on a UE index. Alternatively, the positions in the bitmaps may be determined based on amount of data to be transmitted for each UE and/or priority order of a service relating to the data to be transmitted for each UE.

In some embodiments, the scheduling message comprising the bitmap may be transmitted via RRC signalling, DCI signalling and/or via a MAC CE.

In some embodiments, the BS 300 may be an eNB. In other embodiments, the BS 400 may be a gNB.

According to a fourth aspect, there is provided a first UE 400 for implementing the method 200 according to the second aspect.

Figure 9:
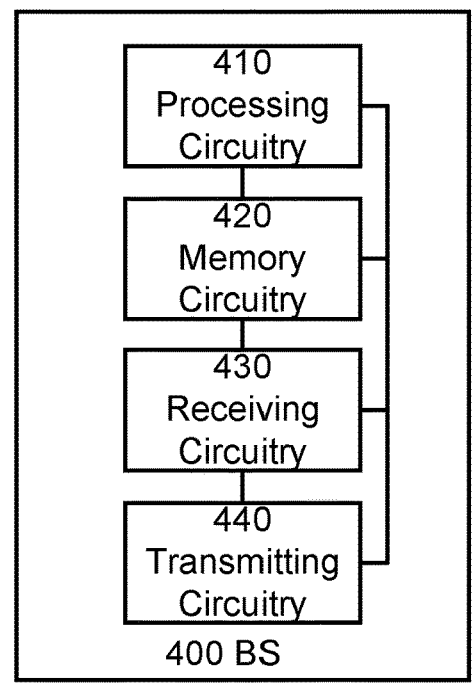
FIG. 9 shows an example implementation of a first UE.

The first UE 400 is now going to be described with reference to FIG. 9. The first UE 400 may be used in, but are not limited to, wireless communications system. The wireless communication system comprises a BS 300 and a plurality of UEs including the first UE 400. The plurality of UEs are assigned to a group. At least two of the UEs within the assigned group have data for group transmission to the BS 300.

The first UE 400 is configured for time domain resource allocation for group transmission in the wireless communication system. As illustrated in FIG. 9, the first UE 400 comprises a processor, or a processing circuitry 410, and a memory, or a memory circuitry 420.

Additionally, or alternatively, the first UE 400 may further comprise a transmitter, or a transmitting circuitry 440, configured to transmit data to other apparatuses, such as the BS 300.

Additionally, or alternatively, the first UE 400 may further comprise a receiver, or a receiving circuitry 430, configured to receive data from other apparatuses, such as the BS 300.

The memory circuitry 420 stores computer program code which, when run in the processing circuitry 410, causes the first UE 400 to transmit, to the BS 300, an aggregated BSR. The aggregated BSR comprises BSRs from the at least two UEs within the assigned group that have data for group transmission to the BS 300. The first UE 400 is further caused to receive, from the BS 300, a scheduling message comprising at least one bitmap. The at least one bitmap indicates scheduled time domain resources for at least one of SL transmissions of data within the assigned group and cooperative UL group transmissions of the data from the UEs within the assigned group to the BS 300. Each bit in each bitmap corresponds to a potential transmission in the corresponding UL and SL.

In some embodiments, the memory circuitry storing computer program code which, when run in the processing circuitry, may further cause the first UE 400 to broadcast, to the plurality of UEs within the assigned group, the received scheduling message comprising the bitmaps.

In some embodiments, the memory circuitry storing computer program code which, when run in the processing circuitry, may further cause the first UE 400 to receive, from one of the UEs within the assigned group that have data for group transmission to the BS, data in the time domain resources in accordance with the received bitmap for the SL transmission of data.

In some embodiments, the memory circuitry storing computer program code which, when run in the processing circuitry, may further cause the first UE 400 to transmit, to the BS 300, data in the time domain resources in accordance with the received bitmap for the cooperative UL group transmission of data.

In some embodiments, sizes of the bitmaps may be set to be at least equal to a number of UEs within the assigned group.

In some embodiments, each UE within the assigned group that has data for transmission may have a corresponding position in the at least one bitmap. The positions in the bitmaps may be determined based on a UE index. Alternatively, the positions in the bitmaps may be determined based on amount of data to be transmitted for each UE and/or priority order of a service relating to the data to be transmit for each UE.

In some embodiments, the scheduling message comprising the bitmap may be transmitted via RRC signalling, DCI signalling and/or via a MAC CE.

According to a fifth aspect, there is provided a computer program, comprising instructions which, when executed on a processing circuitry, cause the processing circuitry to carry out the method according to the first aspect and/or the second aspect.

According to a sixth aspect, there is provided a carrier containing the computer program of the fifth aspect, wherein the carrier is one of an electronic signal, optical signal, radio signal, or computer readable storage medium.

Figure 10:
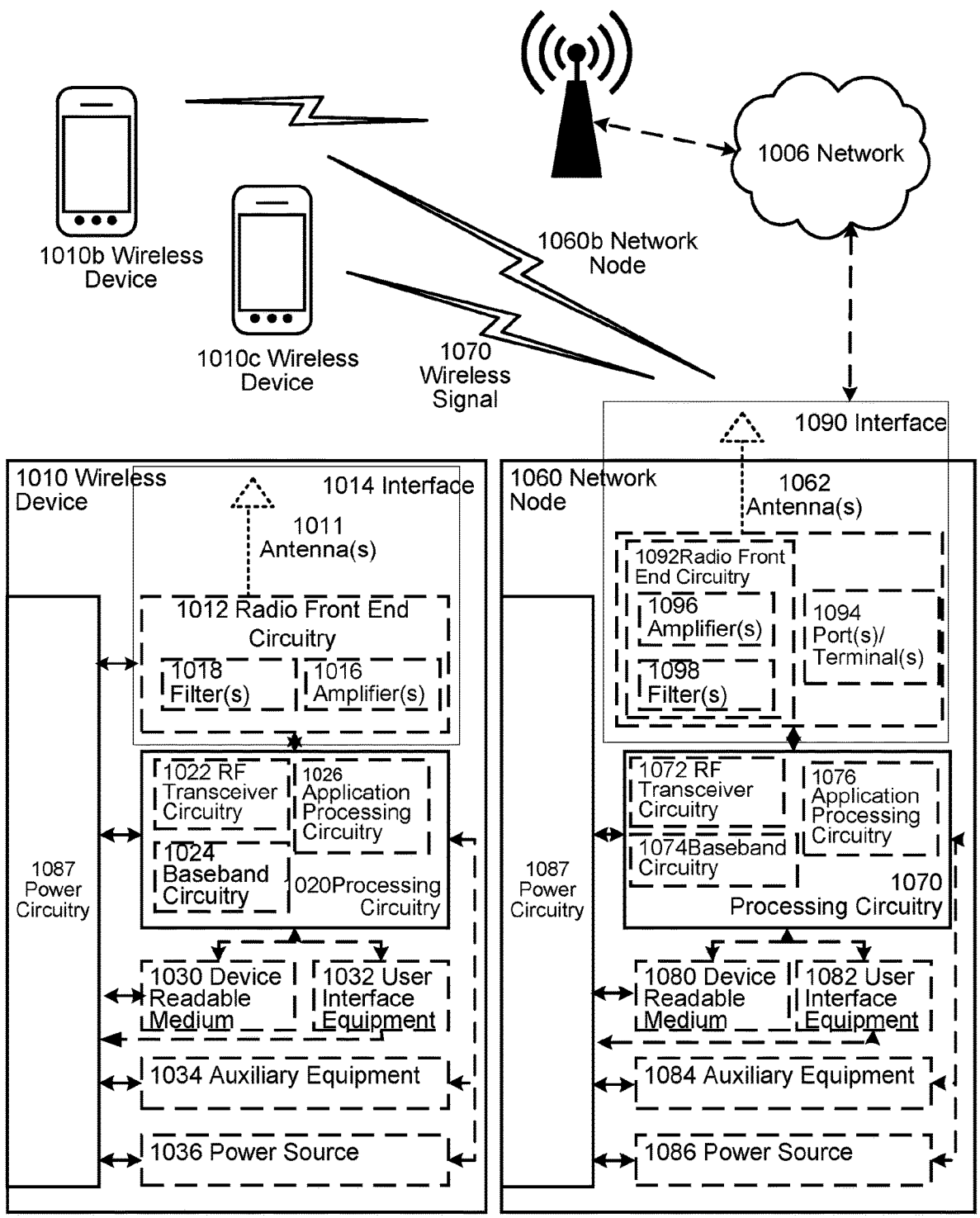
FIG. 10 illustrates an example wireless network.

Although the subject matter described herein may be implemented in any appropriate type of system using any suitable components, the embodiments described herein relate to a wireless network, such as the example wireless communication network illustrated in FIG. 10. For simplicity, the wireless communication network of FIG. 10 only depicts network 1006, network nodes 1060 and 1060b, and Wireless Devices (WDs) 1010, 1010b, and 1010c. The wireless communication network may further include any additional elements suitable to support communication between wireless devices or between a wireless device and another communication device, such as a landline telephone. Of the illustrated components, network node 1060 and wireless device (WD) 1010 are depicted with additional detail. The illustrated wireless communication network may provide communication and other types of services to one or more wireless devices to facilitate the wireless devices' access to and/or use of the services provided by the wireless communication network.

The wireless communication network may comprise and/or interface with any type of communication, telecommunication, data, cellular, and/or radio network or other similar type of system. In some embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless communication network to enable and/or provide wireless access to the wireless device and/or to perform other functions (e.g., administration) in the wireless communication network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, network node 1060 may be a virtual network node as described in more detail below. More generally, however, network nodes may represent any suitable device (or group of devices) capable, configured, arranged, and/or operable to enable and/or provide a wireless device with access to the wireless communication network or to provide some service to a wireless device that has accessed the wireless communication network.

In FIG. 10, Network node 1060 includes processing circuitry 1070, device readable medium 1080, interface 1090, user interface equipment 1082, auxiliary equipment 1084, power source 1086, power circuitry 1087, and antenna 1062. Although network node 1060 illustrated in the example wireless communication network of FIG. 10 may represent a device that includes the illustrated combination of hardware components, other embodiments may comprise network nodes with different combinations of components. It is to be understood that a network node may comprise any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units.

In certain embodiments, some or all of the functionality described herein as being provided by a network node, base station, eNB or other such network device may be provided by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 10100 may be considered to be integrated.

Interface 1090 is used in the wired or wireless communication of signaling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1013 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1013 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
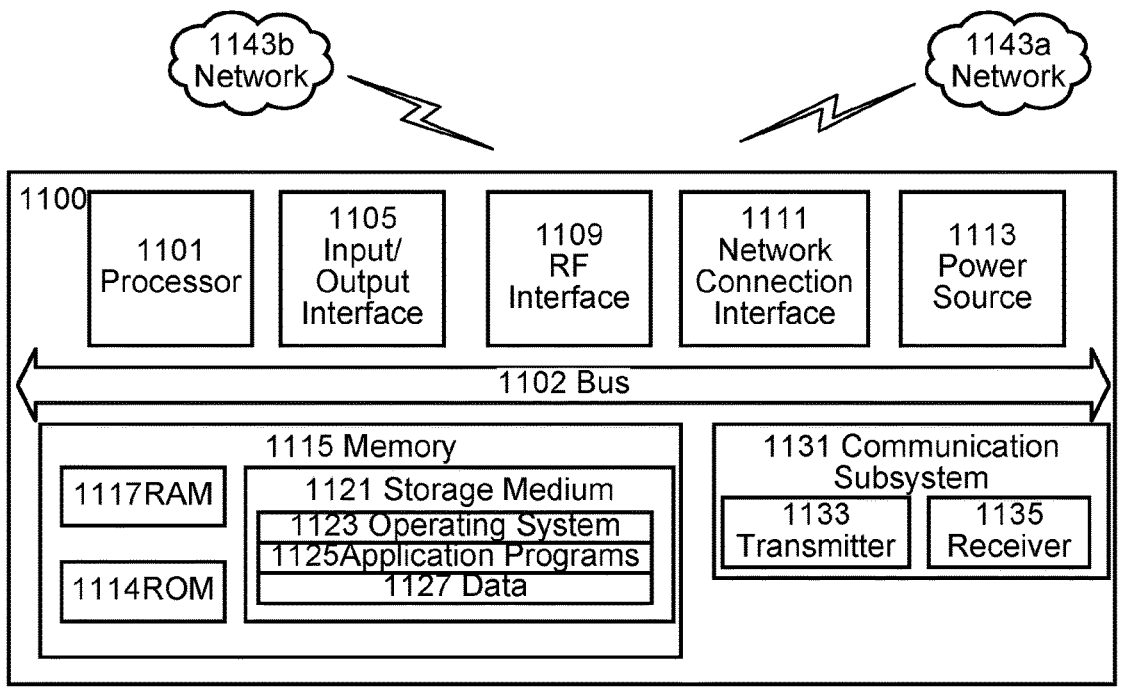
FIG. 11 shows a user equipment according to an embodiment.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1114, and storage medium 1121 or the like, communication subsystem 1131, power source 1113, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1114 may be configured to provide computer instructions or data to processing circuitry 1101. For example, ROM 1114 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.9, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power 5 source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
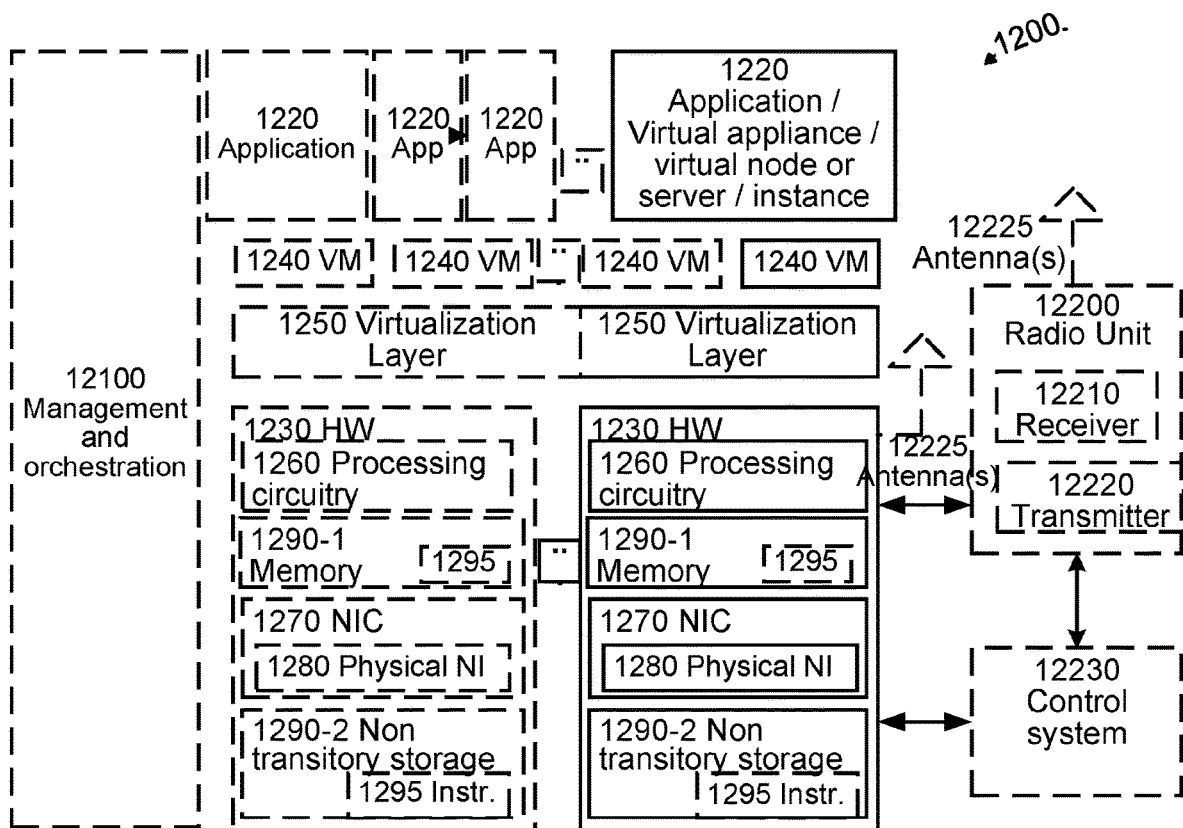
FIG. 12 shows a virtualization environment according to an embodiment.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analogue hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signaling can be affected with the use of control system 12230 which may alternatively be used for communication between the hardware nodes 1230 and radio units 12200.

Figure 13:
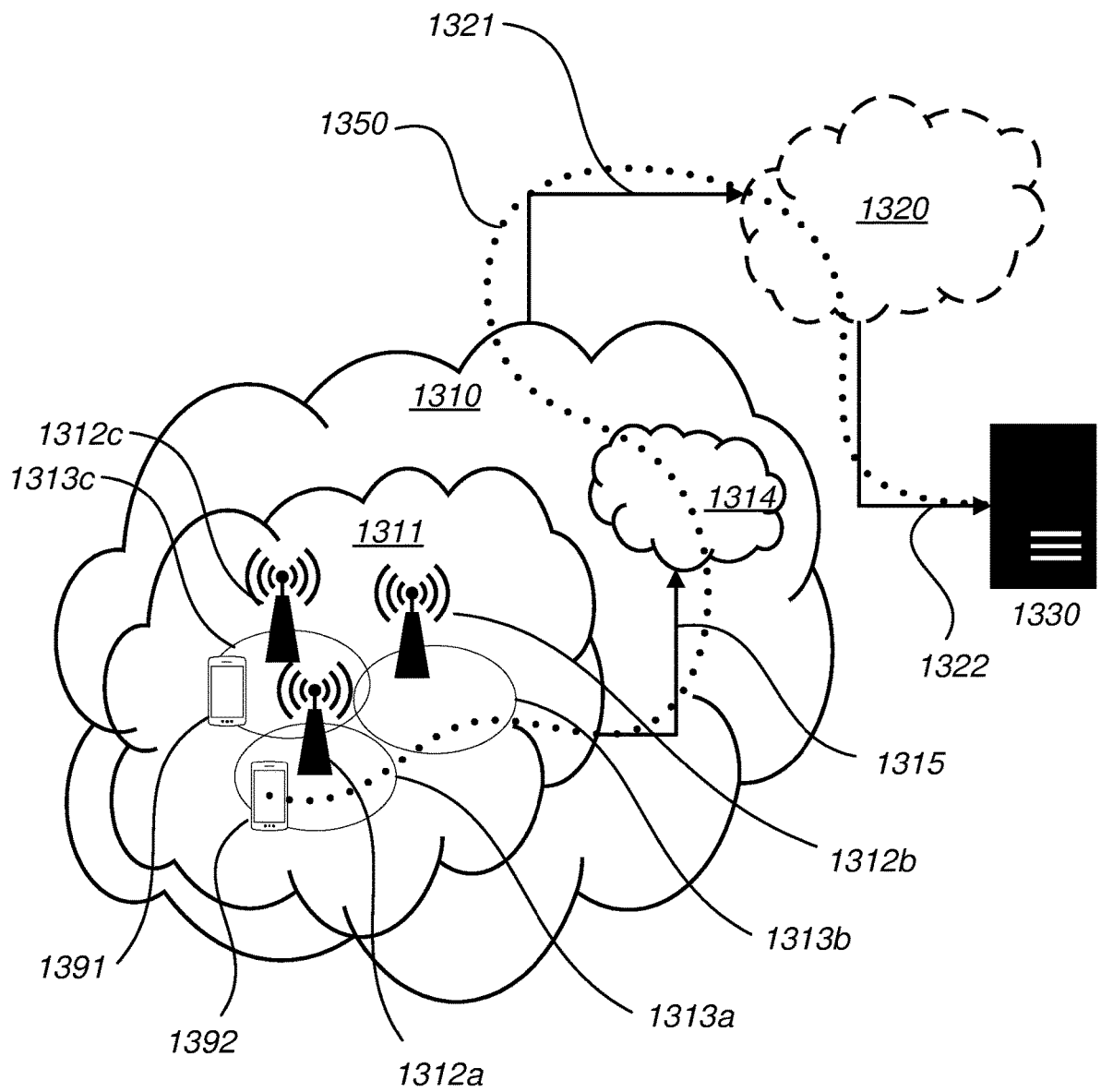
FIG. 13 illustrates an example telecommunication network connected via an intermediate network to a host computer.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1316 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct, or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

Figure 14:
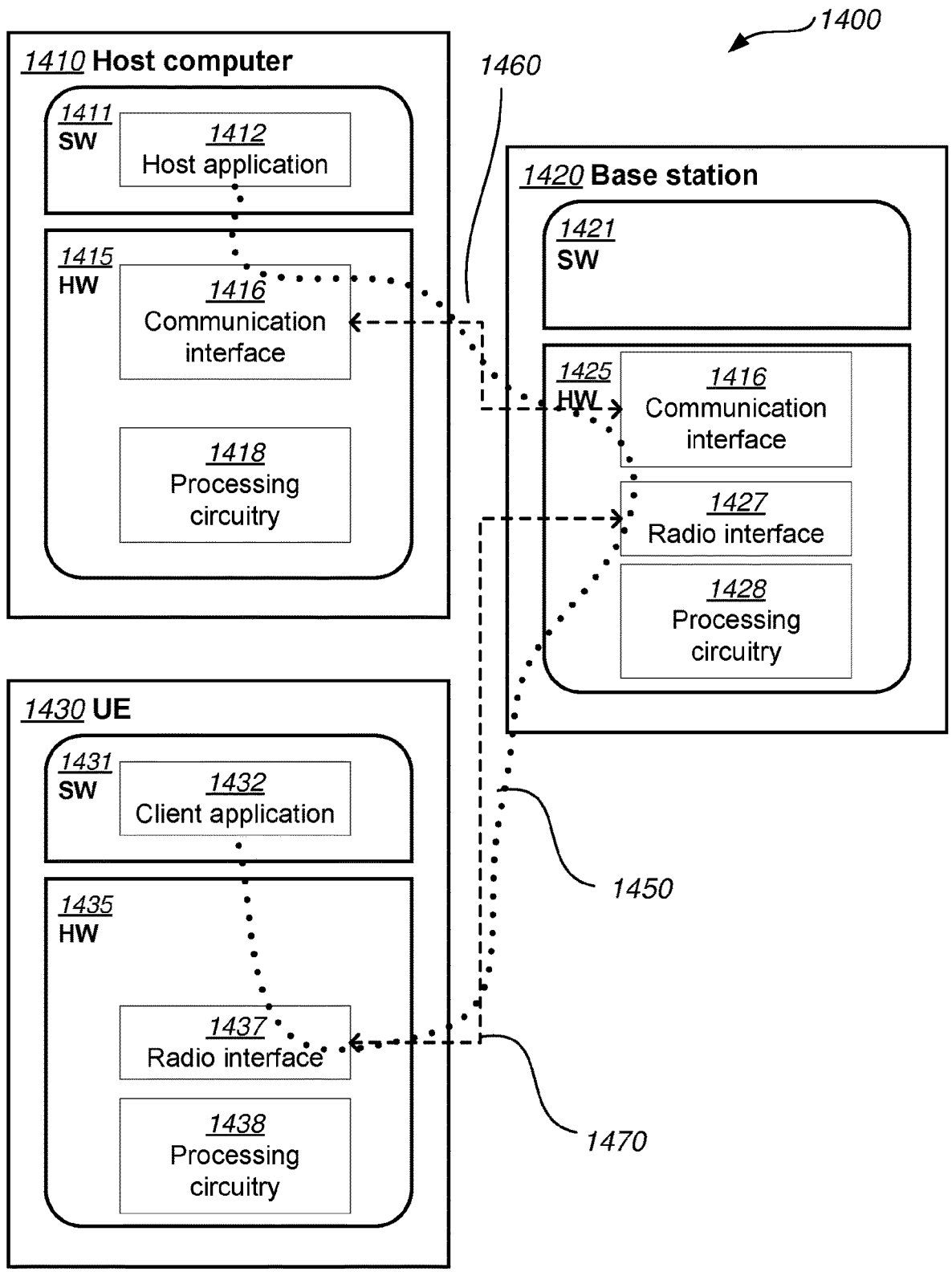
FIG. 14 shows a host computer communicating via a base station with a user equipment over a partially wireless connection according to an embodiment.

It is noted that host computer 1410, base station 1420 and UE 1430 illustrated in FIG. 14 may be similar or identical to host computer 1430, one of base stations 1312*a*, 1312*b*, 1312*c* and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the data rate and thereby provide benefits such as better responsiveness.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
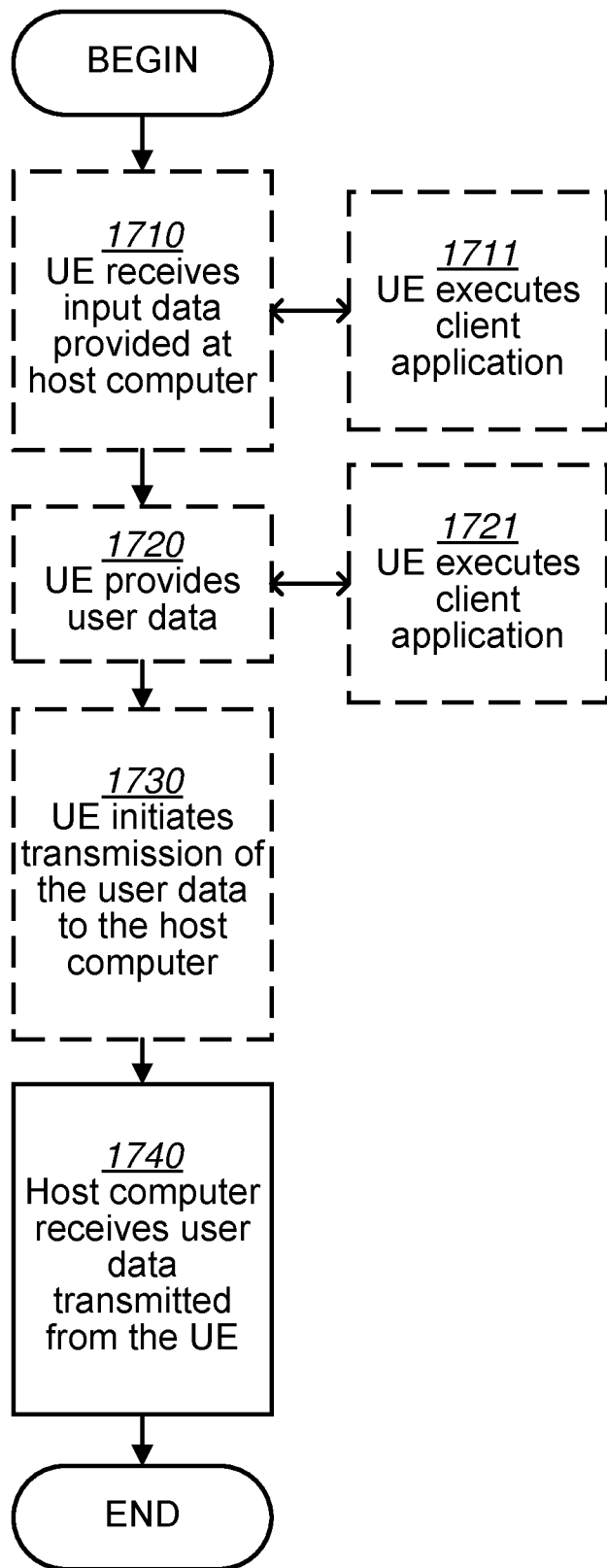
FIGS. 17 and 18 show example methods implemented in a communication system including a host computer, a base station and a user equipment.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
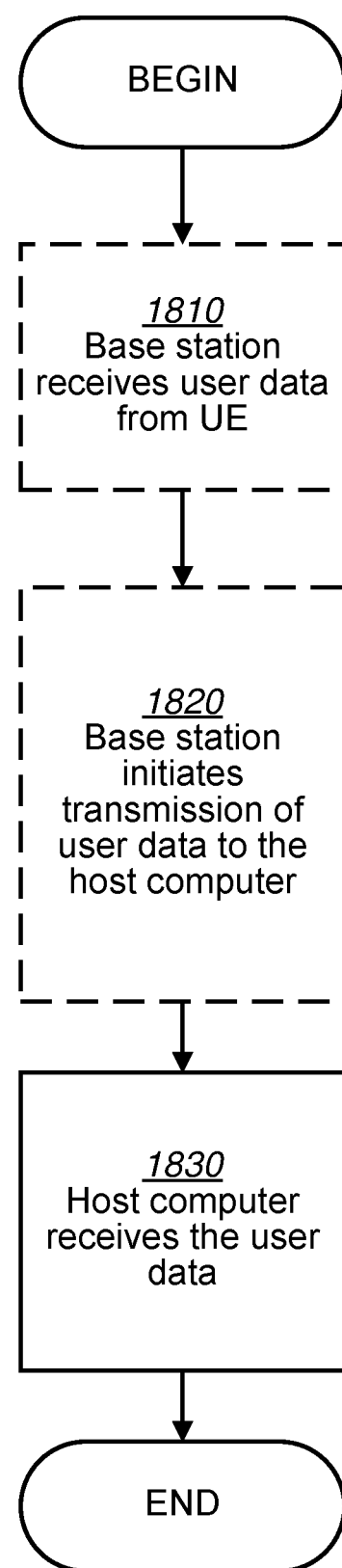

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read-Only Memory (ROM), Random-Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Numbered Embodiments in Particular Related to FIGS. 10-18

1. A Base Station (BS) configured to communicate with a User Equipment (UE), the BS comprising a radio interface and processing circuitry configured to:

receive, from a first UE within the assigned group, an aggregated Buffer Status Report (BSR), wherein the aggregated BSR comprises BSRs from the at least two UEs within the assigned group that have data for group transmission to the BS;

schedule time domain resources for the data to be transmitted via group transmissions to the BS, wherein time resources are scheduled for at least one of SideLink (SL) transmissions of the data within the assigned group and cooperative UpLink (UL) group transmissions of the data from the UEs within the assigned group to the B S, generate at least one bitmap indicating the scheduled time domain resources for at least one of the SL transmissions and the cooperative UL group transmissions, wherein each bit in each bitmap corresponds to a potential transmission in the corresponding UL and SL; and transmit, to the first UE within the assigned group, a scheduling message comprising the generated at least one bitmap.

2. The BS according to embodiment 1, wherein the BS further is configured to:

receive, from each of the UEs within the assigned group, data in the time domain resources in accordance with the transmitted bitmap for the cooperative UL group transmission of data to the BS.

3. The BS according to any of embodiment 1 and 2, wherein sizes of the bitmaps are set to be at least equal to a number of UEs within the assigned group.

4. The BS node according to any of embodiments 1 to 3, wherein each UE that has data for transmission within the assigned group has a corresponding position in the bitmaps.

5. The BS according to embodiment 4, wherein the positions in the bitmaps are determined based on a UE index.

6. The BS according to embodiment 4, wherein the positions in the bitmaps are determined based on amount of data to be transmitted for each UE and/or priority order of a service relating to the data to be transmitted for each UE.

7. The BS according to any of embodiments 1 to 6, wherein the scheduling message comprising the bitmap is transmitted via Radio Resource Control (RRC) signaling, Digital Carrier Interface (DCI) signaling and/or via a Medium Access Control (MAC) Control Element (CE).

8. A communication system including a host computer comprising:

processing circuitry configured to provide user data; and a communication interface configured to forward the user data to a cellular network for transmission to a User Equipment (UE), wherein the cellular network comprises a BS having a radio interface and processing circuitry, the BS's processing circuitry configured to receive, from a first UE within the assigned group, an aggregated BSR, wherein the aggregated BSR comprises BSRs from the at least two UEs within the assigned group that have data for group transmission to the BS; configured to schedule time domain resources for the data to be transmitted via group transmissions to the BS, wherein time resources are scheduled for at least one of SL transmissions of the data within the assigned group and cooperative UL group transmissions of the data from the UEs within the assigned group to the BS, configured to generate at least one bitmap indicating the scheduled time domain resources for at least one of the SL transmissions and the cooperative UL group transmissions, wherein each bit in each bitmap corresponds to a potential transmission in the corresponding UL and SL; and configured to transmit, to the first UE within the assigned group, a scheduling message comprising the generated at least one bitmap.

9. The communication system of embodiment 8, further including the BS.

10. The communication system of embodiment 9, further including the UE, wherein the UE is configured to communicate with the BS.

11. The communication system of embodiment 10, wherein:

the processing circuitry of the host computer is configured to execute a host application, thereby providing the user data; and the UE comprises processing circuitry configured to execute a client application associated with the host application.

12. A method implemented in a BS, comprising receiving, from a first UE within the assigned group, an aggregated BSR, wherein the aggregated BSR comprises BSRs from the at least two UEs within the assigned group that have data for group transmission to the BS;

scheduling time domain resources for the data to be transmitted via group transmissions to the BS, wherein time resources are scheduled for at least one of SL transmissions of the data within the assigned group and cooperative UL group transmissions of the data from the UEs within the assigned group to the BS, generating at least one bitmap indicating the scheduled time domain resources for at least one of the SL transmissions and the cooperative UL group transmissions, wherein each bit in each bitmap corresponds to a potential transmission in the corresponding UL and SL; and transmitting, to the first UE within the assigned group, a scheduling message comprising the generated at least one bitmap.

13. A method implemented in a communication system including a host computer, a BS and a User Equipment (UE), the method comprising:

at the host computer, providing user data; and at the host computer, initiating a transmission carrying the user data to the UE via a cellular network comprising the BS, wherein the BS receiving, from a first UE within the assigned group, an aggregated BSR, wherein the aggregated BSR comprises BSRs from the at least two UEs within the assigned group that have data for group transmission to the BS;

scheduling time domain resources for the data to be transmitted via group transmissions to the BS, wherein time resources are scheduled for at least one of SL transmissions of the data within the assigned group and cooperative UL group transmissions of the data from the UEs within the assigned group to the BS, generating at least one bitmap indicating the scheduled time domain resources for at least one of the SL transmissions and the cooperative UL group transmissions, wherein each bit in each bitmap corresponds to a potential transmission in the corresponding UL and SL; and transmitting, to the first UE within the assigned group, a scheduling message comprising the generated at least one bitmap.

14. The method of embodiment 13, further comprising:
at the BS, transmitting the user data.

15. The method of embodiment 14, wherein the user data is provided at the host computer by executing a host application, the method further comprising:
at the UE, executing a client application associated with the host application.

16. A User Equipment (UE) configured to communicate with a BS, the UE comprising a radio interface and processing circuitry configured to transmit and receive data to and from the BS.

17. A communication system including a host computer comprising:
processing circuitry configured to provide user data; and
a communication interface configured to forward user data to a cellular network for transmission to a User Equipment (UE),
wherein the UE comprises a radio interface and processing circuitry, the UE's processing circuitry configured to transmit and receive data to and from a BS.

18. The communication system of embodiment 17, further including the UE.

19. The communication system of embodiment 18, wherein the cellular network further includes a BS configured to communicate with the UE.

20. The communication system of embodiment 18 or 19, wherein:
the processing circuitry of the host computer is configured to execute a host application, thereby providing the user data; and
the UE's processing circuitry is configured to execute a client application associated with the host application.

21. A method implemented in a communication system including a host computer, a BS and a User Equipment (UE), the method comprising:
at the host computer, providing user data; and
at the host computer, initiating a transmission carrying the user data to the UE via a cellular network comprising the BS, wherein the UE transmits and receives to and from the BS.

22. The method of embodiment 21, further comprising:
at the UE, receiving the user data from the BS.

23. A communication system including a host computer comprising:
a communication interface configured to receive user data originating from a transmission from a User Equipment (UE) to a BS,
wherein the UE comprises a radio interface and processing circuitry, the UE's processing circuitry configured to transmit and receive data to and from the BS.

24. The communication system of embodiment 23, further including the UE.

25. The communication system of embodiment 24, further including the BS,
wherein the BS comprises a radio interface configured to communicate with the UE and a communication interface configured to forward to the host computer the user data carried by a transmission from the UE to the BS.

26. The communication system of embodiment 24 or 25, wherein:
the processing circuitry of the host computer is configured to execute a host application;
and the UE's processing circuitry is configured to execute a client application associated with the host application, thereby providing the user data.

27. The communication system of embodiment 24 or 25, wherein:
the processing circuitry of the host computer is configured to execute a host application, thereby providing request data; and
the UE's processing circuitry is configured to execute a client application associated with the host application, thereby providing the user data in response to the request data.

28. A method implemented in a User Equipment (UE), comprising transmitting and receiving data to and from a BS.

29. The method of embodiment 29, further comprising:
providing user data; and
forwarding the user data to a host computer via the transmission to the BS.

30. A method implemented in a communication system including a host computer, a BS and a User Equipment (UE), the method comprising:
at the host computer, receiving user data transmitted to the BS from the UE, wherein the UE transmitting and receiving data to and from the BS.

31. The method of embodiment 30, further comprising:
at the UE, providing the user data to the BS.

32. The method of embodiment 31, further comprising:
at the UE, executing a client application, thereby providing the user data to be transmitted; and
at the host computer, executing a host application associated with the client application.

33. The method of embodiment 32, further comprising:
at the UE, executing a client application; and
at the UE, receiving input data to the client application, the input data being provided at the host computer by executing a host application associated with the client application,
wherein the user data to be transmitted is provided by the client application in response to the input data.

34. A communication system including a host computer comprising a communication interface configured to receive user data originating from a transmission from a User Equipment (UE) to a Base Station (BS), wherein the BS comprises a radio interface and processing circuitry, the BS's processing circuitry configured to receive, from a first UE within the assigned group, an aggregated BSR, wherein the aggregated BSR comprises BSRs from the at least two UEs within the assigned group that have data for group transmission to the BS; configured to schedule time domain resources for the data to be transmitted via group transmissions to the BS, wherein time resources are scheduled for at least one of SL transmissions of the data within the assigned group and cooperative UL group transmissions of the data from the UEs within the assigned group to the BS, configured to generate at least one bitmap indicating the scheduled time domain resources for at least one of the SL transmissions and the cooperative UL group transmissions, wherein each bit in each bitmap corresponds to a potential transmission in the corresponding UL and SL; and configured to transmit, to the first UE within the assigned group, a scheduling message comprising the generated at least one bitmap.

35. The communication system of embodiment 33, further including the BS.

36. The communication system of embodiment 35, further including the UE, wherein the UE is configured to communicate with the BS.

37. The communication system of embodiment 36, wherein:
the processing circuitry of the host computer is configured to execute a host application;
the UE is configured to execute a client application associated with the host application, thereby providing the user data to be received by the host computer.

38. A method implemented in a communication system including a host computer, a first Base Station (BS) and a User Equipment (UE), the method comprising:
at the host computer, receiving, from the BS, user data originating from a transmission which the BS has received from the UE, wherein the UE transmits and receives data to and from the BS.

39. The method of embodiment 38, further comprising:
at the BS, receiving the user data from the UE.

40. The method of embodiment 39, further comprising:
at the BS, initiating a transmission of the received user data to the host computer.

41. A first User Equipment (UE) configured to communicate with a Base Station (BS), the UE comprising a radio interface and processing circuitry configured to:
transmit, to the BS, an aggregated BSR, wherein the aggregated BSR comprises BSRs from the at least two UEs within the assigned group that have data for group transmission to the BS; and
receive, from the BS, a scheduling message comprising at least one bitmap, wherein the at least one bitmap indicates scheduled time domain resources for at least one of SL transmissions of data within the assigned group and cooperative UL group transmissions of the data from the UEs within the assigned group to the BS, wherein each bit in each bitmap corresponds to a potential transmission in the corresponding UL and SL.

42. The UE according to embodiment 41, wherein the first UE further is configured to:
broadcast, to the plurality of UEs within the assigned group, the received scheduling message comprising the bitmaps.

43. The UE according to embodiment 42, wherein the first UE further is configured to:
receive, from one of the UEs within the assigned group that have data for group transmission to the BS, data in the time domain resources in accordance with the received bitmap for the SL transmission of data.

44. The UE according to embodiment 43, wherein the UE is further configured to:
transmit, to the BS (300), data in the time domain resources in accordance with the received bitmap for the cooperative UL group transmission of data.

45. The UE according to any of embodiments 41 to 44, wherein sizes of the bitmaps are set to be at least equal to a number of UEs within the assigned group.

46. The UE according to any of embodiments 41 to 45, wherein each UE within the assigned group that has data for transmission has a corresponding position in the bitmaps.

47. The UE according to embodiment 46, wherein the positions in the bitmaps are determined based on a UE index.

48. The UE according to embodiment 46, wherein the positions in the bitmaps are determined based on amount of data to be transmitted for each UE and/or priority order of a service relating to the data to be transmit for each UE.

49. The UE according to any of embodiments 41 to 48, wherein the scheduling message comprising the bitmap is transmitted via RRC signaling, DCI signaling and/or via a MAC CE.

50. A method implemented in a User Equipment, comprising
transmitting, to the BS, an aggregated BSR, wherein the aggregated BSR comprises BSRs from the at least two UEs within the assigned group that have data for group transmission to the BS; and
receiving, from the BS, a scheduling message comprising at least one bitmap, wherein the at least one bitmap indicates scheduled time domain resources for at least one of SL transmissions of data within the assigned group and cooperative UL group transmissions of the data from the UEs within the assigned group to the BS, wherein each bit in each bitmap corresponds to a potential transmission in the corresponding UL and SL.

51. A method implemented in a communication system including a host computer, a second network node and a User Equipment (UE), the method comprising:
at the host computer, providing user data; and
at the host computer, initiating a transmission carrying the user data to the UE via a cellular network comprising the second network node, wherein the UE
transmitting, to the BS, an aggregated BSR, wherein the aggregated BSR comprises BSRs from the at least two UEs within the assigned group that have data for group transmission to the BS; and
receiving, from the BS, a scheduling message comprising at least one bitmap, wherein the at least one bitmap indicates scheduled time domain resources for at least one of SL transmissions of data within the assigned group and cooperative UL group transmissions of the data from the UEs within the assigned group to the BS,
wherein each bit in each bitmap corresponds to a potential transmission in the corresponding UL and SL.

52. The method of embodiment 51, further comprising:
at the UE, transmitting the user data.

53. The method of embodiment 52, wherein the user data is provided at the host computer by executing a host application, the method further comprising:
at the UE, executing a client application associated with the host application.

54. A User Equipment (UE) configured to communicate with a BS, the UE comprising a radio interface and processing circuitry configured to transmit and receive data to and from the BS.

55. A communication system including a host computer comprising:
processing circuitry configured to provide user data; and
a communication interface configured to forward user data to a cellular network for transmission to a User Equipment (UE),
wherein the UE comprises a radio interface and processing circuitry, the UE's processing circuitry configured to transmit and receive data to and from a BS.

56. The communication system of embodiment 55, further including the UE.

57. The communication system of embodiment 56, wherein the cellular network further includes a BS configured to communicate with the UE.

58. The communication system of embodiment 56 or 57, wherein:
the processing circuitry of the host computer is configured to execute a host application, thereby providing the user data; and
the UE's processing circuitry is configured to execute a client application associated with the host application.

59. A method implemented in a communication system including a host computer, a BS and a User Equipment (UE), the method comprising:
- at the host computer, providing user data; and
- at the host computer, initiating a transmission carrying the user data to the UE via a cellular network comprising BS, wherein the UE transmits and receives to and from the BS.

60. The method of embodiment 59, further comprising:
at the UE, receiving the user data from the BS.

61. A communication system including a host computer comprising:
- a communication interface configured to receive user data originating from a transmission from a User Equipment (UE) to a BS,
- wherein the UE comprises a radio interface and processing circuitry, the UE's processing circuitry configured to transmit and receive data to and from the BS.

62. The communication system of embodiment 61, further including the UE.

63. The communication system of embodiment 62, further including the BS, wherein the BS comprises a radio interface configured to communicate with the UE and a communication interface configured to forward to the host computer the user data carried by a transmission from the UE to the BS.

64. The communication system of embodiment 62 or 63, wherein:
- the processing circuitry of the host computer is configured to execute a host application;
- and the UE's processing circuitry is configured to execute a client application associated with the host application, thereby providing the user data.

65. The communication system of embodiment 63 or 64, wherein:
- the processing circuitry of the host computer is configured to execute a host application, thereby providing request data; and
- the UE's processing circuitry is configured to execute a client application associated with the host application, thereby providing the user data in response to the request data.

66. A method implemented in a User Equipment (UE), comprising transmitting and receiving data to and from a BS.

67. The method of embodiment 66, further comprising:
- providing user data; and
- forwarding the user data to a host computer via the transmission to the BS.

68. A method implemented in a communication system including a host computer, a BS and a User Equipment (UE), the method comprising:
- at the host computer, receiving user data transmitted to the BS from the UE, wherein the UE transmitting and receiving data to and from the BS.

69. The method of embodiment 68, further comprising:
at the UE, providing the user data to the BS.

70. The method of embodiment 69, further comprising:
- at the UE, executing a client application, thereby providing the user data to be transmitted; and
- at the host computer, executing a host application associated with the client application.

71. The method of embodiment 70, further comprising:
- at the UE, executing a client application; and
- at the UE, receiving input data to the client application, the input data being provided at the host computer by executing a host application associated with the client application, wherein the user data to be transmitted is provided by the client application in response to the input data.

72. A communication system including a host computer comprising a communication interface configured to receive user data originating from a transmission from a User Equipment (UE) to a BS, wherein the UE comprises a radio interface and processing circuitry, the UE's processing circuitry configured to transmit, to the BS (300), an aggregated BSR, wherein the aggregated BSR comprises BSRs from the at least two UEs within the assigned group that have data for group transmission to the BS and configured to receive, from the BS, a scheduling message comprising at least one bitmap, wherein the at least one bitmap indicates scheduled time domain resources for at least one of SL transmissions of data within the assigned group and cooperative UL group transmissions of the data from the UEs within the assigned group to the BS, wherein each bit in each bitmap corresponds to a potential transmission in the corresponding UL and SL.

73. The communication system of embodiment 72, further including the BS.

74. The communication system of embodiment 73, further including the UE, wherein the UE is configured to communicate with the BS.

75. The communication system of embodiment 74, wherein:
- the processing circuitry of the host computer is configured to execute a host application;
- the UE is configured to execute a client application associated with the host application, thereby providing the user data to be received by the host computer.

76. A method implemented in a communication system including a host computer, a BS and a User Equipment (UE), the method comprising:
- at the host computer, receiving, from the BS, user data originating from a transmission which the BS has received from the UE, wherein the UE transmits and receives data to and from the BS.

77. The method of embodiment 76, further comprising:
at the B S, receiving the user data from the UE.

78. The method of embodiment 77, further comprising:
at the BS, initiating a transmission of the received user data to the host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method in a Base Station (BS) for time domain resource scheduling for group transmissions in a wireless communication system, the wireless communication system comprising the BS and a plurality of User Equipment (UEs) including a first UE, the plurality of UEs being assigned to a group, wherein at least two of the UEs within the assigned group have data for group transmission to the BS, the method comprising:
   receiving, from the first UE within the assigned group, an aggregated Buffer Status Report (BSR), wherein the aggregated BSR comprises BSRs from the at least two UEs within the assigned group that have data for group transmission to the BS;
   scheduling time domain resources for the data to be transmitted via group transmissions to the BS, wherein time resources are scheduled for at least one of SideLink (SL) transmissions of the data within the assigned group and cooperative UpLink (UL) group transmissions of the data from the UEs within the assigned group to the BS;
   generating at least one bitmap indicating the scheduled time domain resources for at least one of the SL transmissions and the cooperative UL group transmissions, wherein each bit in each bitmap corresponds to a potential transmission in the corresponding UL and SL; and
   transmitting, to the first UE within the assigned group, a scheduling message comprising the generated at least one bitmap.

2. The method of claim 1, wherein the method further comprises:
   receiving, from each of the UEs within the assigned group, data in the time domain resources in accordance with the transmitted bitmap for the cooperative UL group transmission of data to the BS.

3. The method of claim 1, wherein sizes of the bitmaps are set to be at least equal to a number of UEs within the assigned group.

4. The method of claim 1, wherein each UE that has data for transmission within the assigned group has a corresponding position in the at least one bitmap.

5. The method of claim 4, wherein the positions in the bitmaps are determined based on a UE index.

6. The method of claim 4, wherein the positions in the bitmaps are determined based on amount of data to be transmitted for each UE and/or priority order of a service relating to the data to be transmitted for each UE.

7. The method of claim 1, wherein the scheduling message comprising the bitmap is transmitted via Radio Resource Control (RRC) signaling and/or via a Medium Access Control (MAC) Control Element (CE).

8. A method in a first User Equipment (UE) for time domain resource scheduling for group transmission in a wireless communication system, the wireless communication system comprising a Base Station (BS) and a plurality of UEs including the first UE, the plurality of UEs being assigned to a group, wherein at least two of the UEs within the assigned group have data for group transmission to the BS, the method comprising:
   transmitting, to the BS, an aggregated Buffer Status Report (BSR), wherein the aggregated BSR comprises BSRs from the at least two UEs within the assigned group that have data for group transmission to the BS; and
   receiving, from the BS, a scheduling message comprising at least one bitmap, wherein the at least one bitmap indicates scheduled time domain resources for at least one of SideLink (SL) transmissions of data within the assigned group and cooperative UpLink (UL) group transmissions of the data from the UEs within the assigned group to the BS, wherein each bit in each bitmap corresponds to a potential transmission in the corresponding UL and SL.

9. The method of claim 8, wherein the method further comprises:
   broadcasting, to the plurality of UEs within the assigned group, the received scheduling message comprising the bitmaps.

10. The method of claim 9, wherein the method further comprises:
    receiving, from one of the UEs within the assigned group that have data for group transmission to the BS, data in the time domain resources in accordance with the received bitmap for the SL transmission of data.

11. The method of claim 10, wherein the method further comprises:
    transmitting, to the BS, data in the time domain resources in accordance with the received bitmap for the cooperative UL group transmission of data.

12. The method of claim 8, wherein sizes of the bitmaps are set to be at least equal to a number of UEs within the assigned group.

13. The method of claim 8, wherein each UE within the assigned group that has data for transmission has a corresponding position in the at least one bitmap.

14. The method of claim 13, wherein the positions in the bitmaps are determined based on a UE index.

15. The method of claim 13, wherein the positions in the bitmaps are determined based on amount of data to be transmitted for each UE and/or priority order of a service relating to the data to be transmit for each UE.

16. A Base Station (BS) configured for time domain resource scheduling for group transmissions in a wireless communication system, the wireless communication system comprising the BS and a plurality of User Equipment (UEs) including a first UE, the plurality of UEs being assigned to a group, wherein at least two of the UEs within the assigned group have data for group transmission to the BS, wherein the BS comprises:
    a processing circuitry; and
    a memory circuitry storing computer program code which, when run in the processing circuitry, causes the BS to:
        receive, from the first UE within the assigned group, an aggregated Buffer Status Report (BSR), wherein the aggregated BSR comprises BSRs from the at least two UEs within the assigned group that have data for group transmission to the BS;

schedule time domain resources for the data to be transmitted via group transmissions to the BS, wherein time resources are scheduled for at least one of SideLink (SL) transmissions of the data within the assigned group and cooperative UpLink (UL) group transmissions of the data from the UEs within the assigned group to the BS, generate at least one bitmap indicating the scheduled time domain resources for at least one of the SL transmissions and the cooperative UL group transmissions, wherein each bit in each bitmap corresponds to a potential transmission in the corresponding UL and SL; and transmit, to the first UE within the assigned group, a scheduling message comprising the generated at least one bitmap.

17. A first User Equipment (UE) configured for time domain resource allocation for group transmission in a wireless communication system, the wireless communication system comprising a Base Station (BS) and a plurality of UEs including the first UE, the plurality of UEs being assigned to a group, wherein at least two of the UEs within the assigned group have data for group transmission to the BS, wherein the first UE comprises:

a processing circuitry; and a memory circuitry storing computer program code which, when run in the processing circuitry, causes the first UE to:

transmit, to the BS, an aggregated Buffer Status Report (BSR), wherein the aggregated BSR comprises BSRs from the at least two UEs within the assigned group that have data for group transmission to the BS; and receive, from the BS, a scheduling message comprising at least one bitmap, wherein the at least one bitmap indicates scheduled time domain resources for at least one of SideLink (SL) transmissions of data within the assigned group and cooperative UpLink (UL) group transmissions of the data from the UEs within the assigned group to the BS, wherein each bit in each bitmap corresponds to a potential transmission in the corresponding UL and SL.

* * * * *